(12) United States Patent
Sahinoglu et al.

(10) Patent No.: US 7,573,835 B2
(45) Date of Patent: Aug. 11, 2009

(54) METHOD, SYSTEM, NODE, COMPUTER PROGRAM PRODUCT AND COMMUNICATION PACKET FOR COMMUNICATING INFORMATION IN AN AD-HOC HIERARCHICALLY ADDRESSED COMMUNICATION NETWORK

(75) Inventors: Zafer Sahinoglu, Somerville, MA (US); Gang Ding, West Lafayette, IN (US)

(73) Assignee: Renesas Technology Corporation, Tokyo (JP)

( * ) Notice: Subject to any disclaimer, the term of this patent is extended or adjusted under 35 U.S.C. 154(b) by 996 days.

(21) Appl. No.: 10/918,403

(22) Filed: Aug. 16, 2004

(65) Prior Publication Data

US 2006/0034191 A1    Feb. 16, 2006

(51) Int. Cl.
*H04L 12/28* (2006.01)
(52) U.S. Cl. .................................. 370/255; 370/390
(58) Field of Classification Search ................ 370/254, 370/338, 255, 256, 257
See application file for complete search history.

(56) References Cited

U.S. PATENT DOCUMENTS

| | | | | |
|---|---|---|---|---|
| 5,412,654 | A * | 5/1995 | Perkins ..................... | 370/312 |
| 5,717,688 | A * | 2/1998 | Belanger et al. ............ | 370/331 |
| 6,104,712 | A * | 8/2000 | Robert et al. ............... | 370/389 |
| 6,115,580 | A * | 9/2000 | Chuprun et al. .............. | 455/1 |
| 6,243,581 | B1 * | 6/2001 | Jawanda ................. | 455/432.2 |
| 6,304,556 | B1 * | 10/2001 | Haas ......................... | 370/254 |
| 6,526,054 | B1 * | 2/2003 | Li et al. ...................... | 370/390 |
| 6,556,543 | B1 * | 4/2003 | Park et al. ................... | 370/255 |
| 6,982,960 | B2 * | 1/2006 | Lee et al. .................... | 370/254 |
| 7,177,295 | B1 * | 2/2007 | Sholander et al. ........... | 370/338 |
| 2005/0122955 | A1 * | 6/2005 | Lin et al. .................... | 370/351 |

OTHER PUBLICATIONS

Ma et al, Routing high-bandwidth traffic in maximum fair share networks, ACM Digital Library, 1996.*
Narten, RFC 2461, Neighborhood Discovery for IP Version 6 (IPV6), Dec. 1998.*
Hyojun Lim et al., "Flooding in Wireless Ad Hoc Networks," School of computer Science and Engineering, Seoul National University, Seoul, Korea, Apr. 26, 2000, pp. 1-19.
Brad Williams et al., "Comparison of Broadcasting Techniques for Mobile Ad Hoc Networks," Department of Math and Computer Science Colorado School of Mines Golden, CO., http://toilers.mines.edu, Mar. 15, 2002, 16 pages.

(Continued)

*Primary Examiner*—Hassan Kizou
*Assistant Examiner*—Mounir Moutaouakil
(74) *Attorney, Agent, or Firm*—Oblon, Spivak, McClelland, Maier & Neustadt, P.C.

(57) ABSTRACT

A method of communicating information in a communication network with a plurality of hierarchically addressed nodes includes receiving communication packets identifying 1-hop neighbor node addresses, a number of on-tree neighbors of neighbor nodes transmitting the received packets, and forwarding node addresses of forwarding nodes from which information in the received packets are to be rebroadcast. Further, the method includes identifying each 1-hop neighbor node which should be a forwarding node based on stored addresses and numbers of on-tree neighbors, and producing and transmitting a rebroadcast packet including addresses of forwarding nodes. A communication network system, a communication node in a communication network, and a computer program product include similar features. Communication packets embodied in an electromagnetic wave includes an address, a number of on-tree neighbors of neighbor nodes, and forwarding nodes from which the packets are to be rebroadcast.

120 Claims, 12 Drawing Sheets

OTHER PUBLICATIONS

Mario Cagalj et al., "Minimum-Energy Boradcast in All-Wireless Networks: NP-Completeness and Distribution Issues," LCA-EPFL, CH-1015 Lausanne, Switzerland, Sep. 23-26, 2002, 11 pages.

Julien Cartigny et al., "Localized Minimum-Energy Broadcasting in Ad-Hoc Networks," University de Lille 1, Cite Scientifique, Bat. M3 Cedex France, IEEE INFOCOM 2003, 8 pages.

Sze-Yao Ni et al., "The Broadcast Storm Problem in a Mobile Ad Hoc Network," Department of computer Science and Information Engineering National Central University Chung-Li, Taiwan, http://www.csie.ncu.edu.tw/~yctseng/, Fifth Annual International Conference of Mobile Computing and Networking, Seattle, Washington, Aug. 15-20, 1999, pp. 1-12.

Fei Dai et al., "Performance Analysis of Broadcast Protocols in Ad-Hoc Networks Based on Self-Pruning," Department of Computer Science and Engineering Florida Atlantic University, Boca Raton, Florida, pp. 1-6.

Wei Lou et al., "Localized Broadcasting in Mobile Ad Hoc Networks Using Neighbor Designation," Department of computer Science and Engineering, Florida Atlantic University, Boca Raton, Florida, Jul. 30, 2003, pp. 1-28.

IEEE Standard for Information Technology—Telecommunication and Information exchange between systems-Local and Metropolitan area networks- Specific Requirements, Part 15.4 "Wireless Medium Access Control (MAC) and Physical Layer (PHY) Specification for Low-Rate Wireless Personal Area Networks (LR_WPANs)," Copyright 2003, pp. 1, 139-168.

* cited by examiner

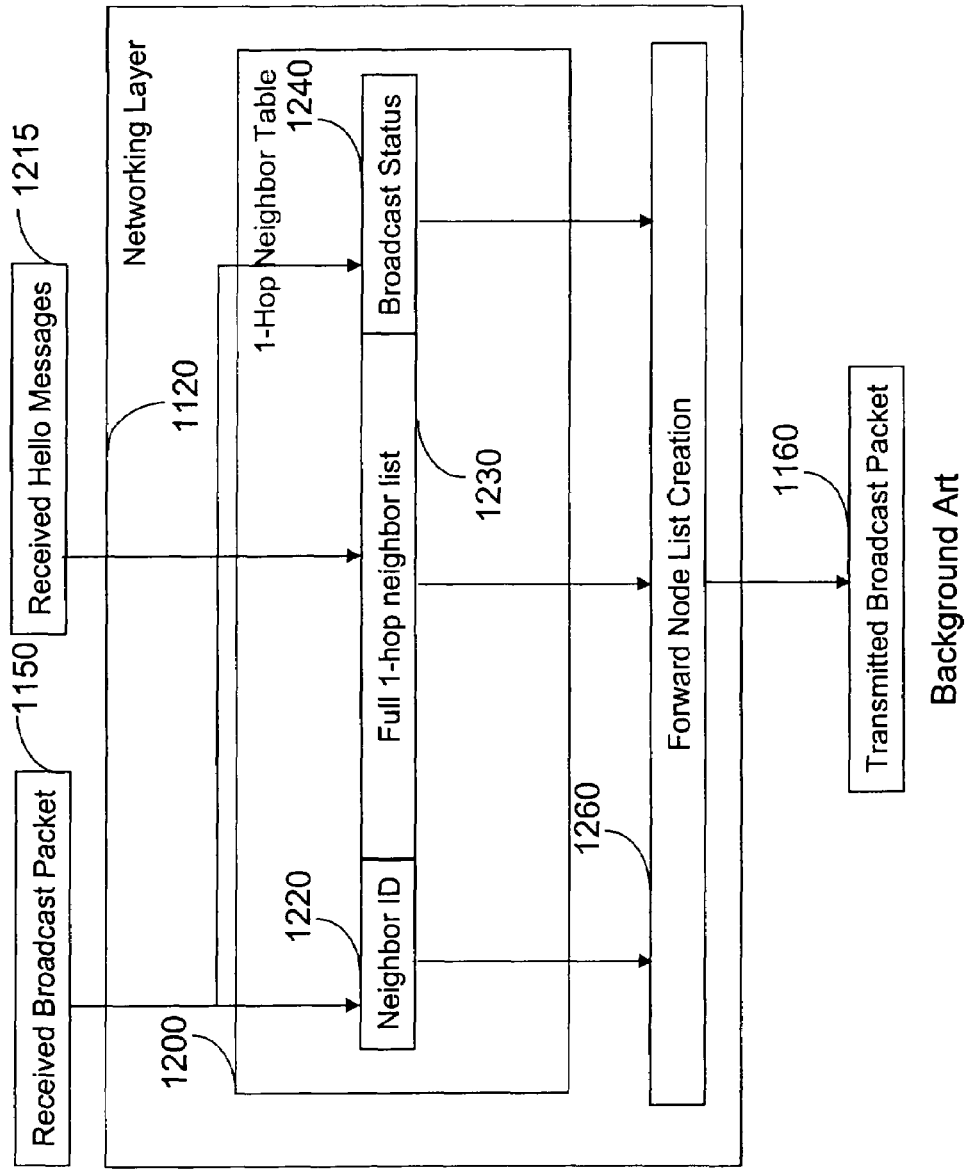

METHOD, SYSTEM, NODE, COMPUTER PROGRAM PRODUCT AND COMMUNICATION PACKET FOR COMMUNICATING INFORMATION IN AN AD-HOC HIERARCHICALLY ADDRESSED COMMUNICATION NETWORK

BACKGROUND OF THE INVENTION

1. Field of the Invention

This invention generally relates to wireless ad-hoc and sensor networks and in particular to a method, device and computer program product configured to select forward wireless nodes for data packet rebroadcast in network wide broadcasting.

2. Discussion of the Background

To broadcast a packet throughout an entire ad-hoc or sensor network including a plurality of nodes (e.g., wireless nodes) while multi-hopping from one node to another, all or some nodes need to rebroadcast the packet. Further, in a network with a dynamic topography, including a plurality of nodes that may be mobile and/or nodes that are added and removed from a network, it is impractical to determine statically which nodes should forward broadcast packets to their neighbors.

A simple approach is flooding, in which every node rebroadcasts the data packet exactly one time upon receiving it. Simple flooding causes a number of broadcasts as high as a number of nodes in a network. Therefore, it is not a desired solution due to traffic overhead generated within the network. S. Ni, Y. Tsing, Y. Chen, and J. Sheu, "The Broadcast Storm Problem in a Mobile Ad Hoc Network," MobiCom, 1999, which is incorporated by reference herein in its entirety, pointed out the "broadcast storm problem" when every device forwards the packet once and recommends several approaches to reduce the number of forward nodes so that every node can still receive the broadcast packet:

A probabilistic scheme allows forwarding with a pre-specified probability p. A counter based scheme forwards a packet only if the number of duplicated broadcast packets received during a waiting interval is less than a threshold. If position information is available, a location based scheme only forwards when the additional coverage area is larger than a threshold. B. Williams and T. Camp, "Comparison of Broadcasting Techniques for Mobile Ad Hoc Networks," MobiHoc, 2002, which is incorporated by reference herein in its entirety, compared these schemes to many other approaches.

The knowledge of network topology can be employed to make a better decision on selecting forward nodes. H. Lim and C. Kim, "Flooding in Wireless Ad Hoc Networks," Computer Communication Journal, 24(3-4): 353-363, 2001, which is incorporated by reference herein in its entirety, stated that if the global network topology information is known, the problem of selecting the minimum number of forward nodes is NP-complete. But the optimal solution can be approximated with a constant ratio if position information is available.

If only local network topology information is available, such as a list of 1-hop or 2-hop neighbors, two major approaches are used to select forward nodes. In a self-pruning scheme, a node itself decides whether to forward or not, as described in F. Dai and J. Wu, "Performance Analysis of Broadcast Protocols in Ad Hoc Networks Based on Self-Pruning," IEEE Trans. on Parallel and Distributed Systems, to appear, 2004, which is incorporated by reference herein in its entirety. In a neighbor-designation scheme, as suggested in W. Lou and J. Wu, "Localized Broadcasting in Mobile Ad Hoc Networks Using Neighbor Designation," Handbook of Mobile Computing, CRC Press, 2004, which is incorporated by reference herein in its entirety, a node is assigned a subset of its neighbors to rebroadcast. To get 2-hop neighbor information, Lou and Wu assume that nodes exchange "Hello" messages with their 1-hop neighbors. These "Hello" messages contain the number of 1-hop neighbors.

Energy efficiency in broadcast has been extensively studied. For example, M. Cagalj, J. Hubaux, and C. Enz, "Minimum-Energy Broadcast in All-Wireless Networks: NP-Completeness and Distribution Issues," MobiCom 2002, which is incorporated by reference herein in its entirety, proposed a centralized algorithm. However, for their centralized algorithm to find a minimum energy broadcast tree is a NP-complete problem. On the other hand, local algorithms such as described by J. Cartigny, D. Simplot, and I. Stojmenovic, "Localized Minimum-Energy Broadcasting in Ad-Hoc Networks," InfoCom 2003, which is incorporated by reference herein in its entirety, need position information and controlled power, and may not be able to closely approximate the optimal solution either.

FIG. 11 shows an example of a node 1100 operating according to these background methods. The node 1100 includes a physical and MAC layer 1140 that receives packets 1150 transmitted from other devices in the network. Each received packet 1150 includes a message 1115 and source address 1125. If the received packet 1150 is a data broadcast packet, the received packet 1150 also includes a list of forwarding nodes 1170. The physical and MAC layer 1140 passes the received packet 1150 to the networking layer 1120, and the networking layer 1120 determines a forwarding strategy for the received packet 1150. The networking layer 1120 also forms a new packet 1160 that includes a list of new forwarding nodes 1180 and new source address 1135. The new packet 1160 is then broadcast by the physical and MAC layer 1140.

FIG. 12 shows a detailed view of a background networking layer 1120, which performs forward node selection and creation of a forward node list 1180. Node 1100 maintains a 1-hop neighbor table 1200 at the networking layer 1120. The 1-hop neighbor table 1200 includes, for each neighbor of the device, a neighbor addresses 1220, a full list of 1-hop neighbor addresses 1230 (i.e., list of addresses of 1-hop neighbors of the neighbor) and a broadcast flag 1240.

In the background method, every node 1100 updates the full 1-hop neighbor list 1230 for each neighbor 1220 by exchanging a "Hello" message 1215 with neighbor 1220. However, the neighbor table exchanging disadvantageously introduces excess traffic into the network, because messages are exchanged between every pair of nodes in the network. In particular, the Forward Node List Creation Unit 1260 uses every Neighbor ID 1220, 1-hop neighbor list 1230 and Broadcast Flag 1240 in the 1-hop neighbor table 1200 to determine the list of forwarding nodes 1180, which is to be inserted into the rebroadcast packet 1160. As a result, the background method produces excess traffic for exchanging full neighbor information. Further, background methods with excess traffic are energy inefficient because every transmitted bit consumes power, and this is especially significant for nodes that operate from a battery power source.

SUMMARY OF THE INVENTION

A method of communicating information in a communication network including a plurality of hierarchically addressed nodes according to the present invention includes receiving at a current node communication packets transmitted from 1-hop neighbor nodes within a communication range of the current node. The communication packets identify 1-hop neighbor node addresses of the respective 1-hop neighbor nodes transmitting the packets, a number defining how many on-tree neighbor nodes have a child or parent hierarchical relationship with the respective 1-hop neighbor nodes transmitting the packets, and forwarding node addresses of forwarding nodes from which the received packets are to be rebroadcast.

Further, the method includes storing the 1-hop neighbor node addresses and the number of on-tree neighbor nodes.

In addition, when a received packet at the current node identifies the current node as a forwarding node which should rebroadcast the received packet, the present method includes identifying based on the stored 1-hop neighbor addresses and the stored number of on-tree neighbor nodes, each 1-hop neighbor node which should be a forwarding node instructed to rebroadcast information included in a communication packet received from the current node. The present method also includes producing at the current node a rebroadcast communication packet including information to be rebroadcast, an address of the current node, and addresses of forwarding nodes identified in the identifying step above when the received packet at the current node identifies the current node as a forwarding node which should rebroadcast the received information, and transmitting from the current node the rebroadcast communication packet.

A communication network system according to the present invention includes a plurality of hierarchically addressed nodes. Each of the nodes includes a receiving section configured to receive at a current node communication packets transmitted from 1-hop neighbor nodes within a communication range of the current node. The communication packets identify 1-hop neighbor node addresses of the respective 1-hop neighbor nodes transmitting the packets, a number defining how many on-tree neighbor nodes have a child or parent hierarchical relationship with the respective 1-hop neighbor nodes transmitting the packets, and forwarding node addresses of forwarding nodes from which the received packets are to be rebroadcast.

Further, the node in the communication network system includes a storing section configured to store the 1-hop neighbor node addresses and the number of on-tree neighbor nodes.

In addition, the node in the communication network system includes an identifying section, when a received packet at the current node identifies the current node as a forwarding node which should rebroadcast the received packet, configured to identify based on the stored 1-hop neighbor node addresses and the stored number of on-tree neighbor nodes, each 1-hop neighbor node which should be a forwarding node instructed to rebroadcast a communication packet received from the current node.

The node in the communication network system also includes a producing section configured to produce at the current node a rebroadcast communication packet including information to be rebroadcast, an address of the current node, and addresses of forwarding nodes identified in the identifying section when the received packet at the current node identifies the current node as a forwarding node which should rebroadcast the received information, and a transmitting section configured to transmit the rebroadcast communication packet produced by the producing section.

A node in a communication network that includes a plurality of hierarchically addressed nodes, where the node has a current node address and is configured to be within a communication range of 1-hop neighbor nodes and in a hierarchical relationship with a number of respective on-tree parent and child nodes and is configured to rebroadcast a received packet identifying the current node address as a forwarding node, includes a receiving section configured to receive communication packets identifying 1-hop neighbor node addresses of respective 1-hop neighbor nodes transmitting the packets, a number defining how many on-tree neighbor nodes have a child or parent hierarchical relationship with the respective 1-hop neighbor nodes transmitting the packets, and forwarding node addresses of forwarding nodes from which the received packets are to be rebroadcast.

Further, the node includes a storing section configured to store the 1-hop neighbor addresses and the number of on-tree neighbor nodes.

In addition, the node includes an identifying section configured to identify, based on the stored 1-hop neighbor addresses and the stored number of on-tree neighbor nodes, each 1-hop neighbor node which should be a forwarding node instructed to rebroadcast information included in a received communication packet.

The node also includes a producing section configured to produce a rebroadcast communication packet including information to be rebroadcast, the current node address, and addresses of forwarding nodes identified in the identifying section when the received packet identifies the current node address as a forwarding node which should rebroadcast the received information, and a transmitting section configured to transmit the produced rebroadcast communication packet.

A computer program product storing computer program instructions which when executed by a computer cause the computer to perform receiving at a current node communication packets transmitted from 1-hop neighbor nodes within a communication range of the current node. The communication packets identify 1-hop neighbor node addresses of the respective 1-hop neighbor nodes transmitting the packets, a number defining how many on-tree neighbor nodes have a child or parent hierarchical relationship with the respective 1-hop neighbor nodes transmitting the packets, and forwarding node addresses of forwarding nodes from which the received packets are to be rebroadcast.

Further, the computer program product includes storing the 1-hop neighbor node addresses and the number of on-tree neighbor nodes.

In addition, when a received packet at the current node identifies the current node as a forwarding node which should rebroadcast the received packet, the present computer program product includes identifying based on the stored 1-hop neighbor addresses and the stored number of on-tree neighbor nodes, each 1-hop neighbor node which should be a forwarding node instructed to rebroadcast information included in a communication packet received from the current node.

The present computer program product also includes producing at the current node a rebroadcast communication packet including information to be rebroadcast, an address of the current node, and addresses of forwarding nodes identified in the identifying step above when the received packet at the current node identifies the current node as a forwarding node which should rebroadcast the received information, and transmitting from the current node the rebroadcast communication packet.

A communication packet embodied in an electromagnetic wave and configured to communicate information in a communication network that includes a plurality of hierarchically addressed nodes, includes an address of a transmitting node, the information, and a number of on-tree neighbor nodes having a child or parent relationship with the transmitting node.

A further communication packet embodied in an electromagnetic wave and configured to communicate information in a communication network that includes a plurality of hierarchically addressed nodes, includes an address of a transmitting node, the information, and forwarding node addresses of forwarding nodes in the plurality of hierarchically addressed nodes from which the signal is to be rebroadcast.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 11 and 12 illustrate a background method of communicating information in a communication network.

DESCRIPTION OF THE PREFERRED EMBODIMENTS

Figure 1:
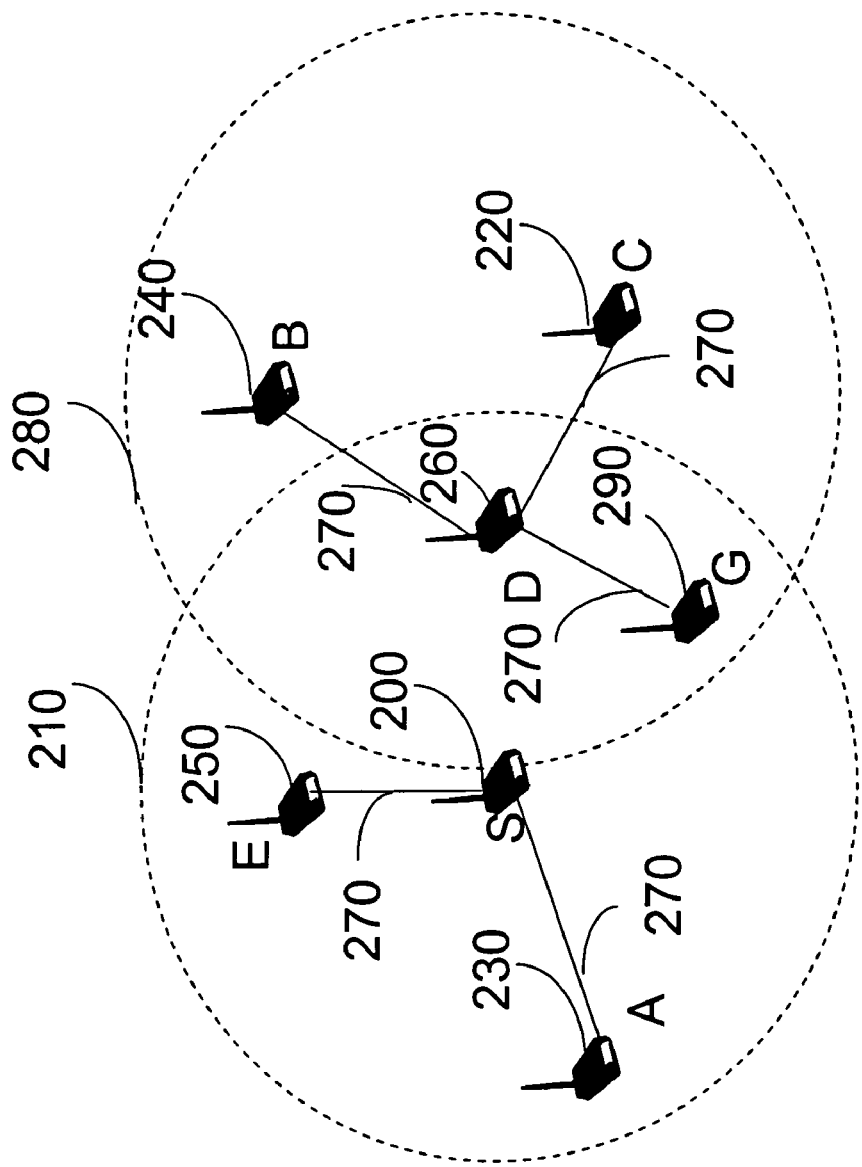
FIG. 1 illustrates an example of 1-hop neighbors and on-tree neighbors of a node.

Referring now to the drawings, wherein like reference numerals designate identical or corresponding parts throughout the several views, FIG. 1 illustrates nodes in a communication network and indicates nodes that may communicate with each other. In particular, nodes A 230, D 260, E 250 and G 290 are 1-hop neighbors of node S 200 and may communicate with node S 200, because those nodes are within the communication range 210 of node S 200. On the other hand, nodes B 240 and C 220 are two-hop neighbors of node S 200 through the node D 260. The lines 270 indicate a hierarchical tree connectivity between nodes. In other words, the nodes connected with the lines 270 have parent and child relation with one another. For instance, node A 230 may be referred to as a child of node S 200. In this example, the addresses of children nodes are assigned by their parents, though other node address assignment methods are also possible. Communication range 280 represents the set of nodes within two-hop communication range of S 200.

Further, nodes may be mobile and thus may move from one physical location to another. When a node moves, it may associate with a new parent, and when the node associates with a new parent, the node will receive a new address, assigned by the parent. If a parent moves, leaving a child node as an orphan, the orphan node will perform orphan scanning to find a new parent, for example according to section 7.5 of the IEEE 802.15.4 MAC layer specification, which is incorporated by reference herein in its entirety.

Figure 2:
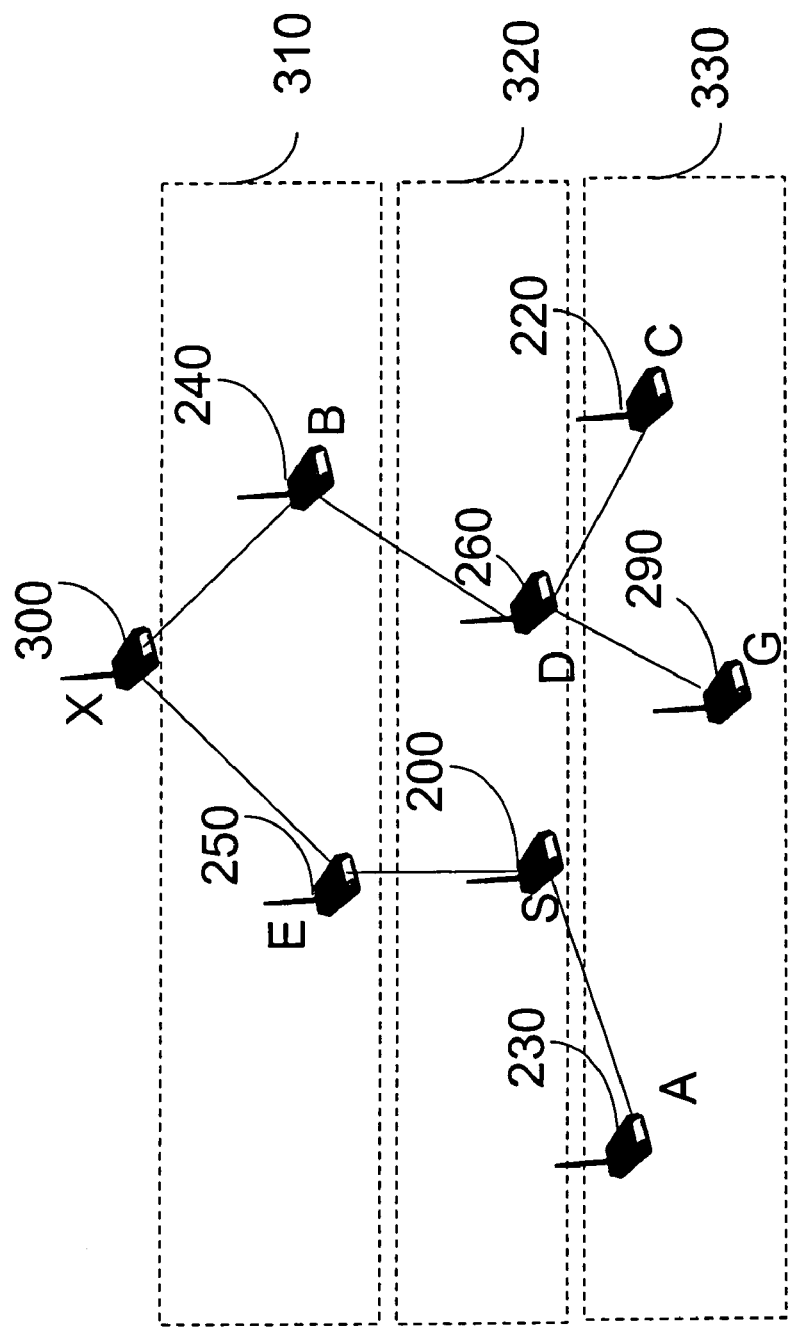
FIG. 2 illustrates an example of hierarchical node address assignment in a network.

FIG. 2 illustrates an example of a hierarchical distribution of node addresses in a communication network. According to this example, network formation is started by node X 300. Direct children of X 300, nodes E 250 and B 240, are considered as level-1 nodes 310, which is one level greater than the parent node X 300. Children of level-1 nodes are nodes on level-2 320 and children of nodes on level-2 are level-3 nodes, and so on. As long as every node knows the maximum number of allowable children per node in the network and knows the hierarchical address assignment scheme, the level and parent address of any 1-hop neighbor node can be determined.

As illustrated in the example of FIG. 1, the set of 1-hop neighbors of node S 200 is {A 230, E 250, D 260, G 290}, the set of 1-hop on-tree neighbors of node S 200 is {A 230, E 250}, and the set of 2-hop neighbors of node S 200, defined as nodes within 1-hop of node S200 and 1-hop within node S 200's 1-hop neighbors, is {A 230, E 250, D 260, G 290, C 220, B 240}. Nodes D 260 and G 290 in FIG. 1 are non-tree 1-hop neighbors of node S 200. Thus, as illustrated in the above examples, the set of 1-hop tree neighbors of any node in a network is a subset of its 1-hop neighbors, and the set of 1-hop neighbors of the same node is a subset of its 2-hop neighbors.

To facilitate the description, some notations are listed in Table 1, where u and v represent a set of nodes or a single node. Thus $u \subseteq N_{k-1}(u) \subseteq N_k(u)$ where $k \geq 1$, and $N(u) \subseteq N(v)$ when $u \subseteq v$.

TABLE 1

Notations

| | |
|---|---|
| $N_0(u)$ | u itself |
| $N_1(u)$ or $N(u)$ | 1-hop neighbor of u, including u |
| $N_k(u)$ ($k \geq 2$) | $N(N_{k-1}(u))$ |
| u covers v | $B \subseteq N(u)$ |
| $TN_0(u)$ | u |
| $TN_1(u)$ or $TN(u)$ | 1-hop on-tree neighbors of u, including u (i.e., on tree neighbors of the neighbors of u) |
| $TN_k(u)$ ($k \geq 2$) | $TN(TN_{k-1}(u))$ |
| u on-tree covers v | $v \subseteq TN(u)$ |
| S(u) | Candidate forward nodes of u |
| C(u) | To-be-covered nodes of u |
| F(u) | Forward nodes of u |
| N | Maximum number of 1-hop neighbors |
| $n_m$ | Maximum number of children |
| $d_m$ | Maximal depth of a tree |

Background forward node selection methods assume that complete 2-hop neighbor information N2(v) is available and provided in "Hello" messages from neighbor nodes. Forward nodes set F(v) is a subset of N(v) that can cover all nodes in N2(v). The present invention assumes only that 1-hop neighbors are available, and further assumes that the extra effort to obtain the complete list of 2-hop neighbors using "Hello" messages is undesirable. By virtue of the hierarchical logical structure constructed during network formation, a node in a network according to the present invention can determine more than just its 1-hop neighbors. Given the network address of a node v, v can determine the addresses of its 1-hop on-tree neighbors, TN(v), including its parent and children. Since v knows all its 1-hop neighbors N(v) and their number of children by eavesdropping on directed communication packets sent by 1-hop neighbor nodes to other nodes, it can determine the current 1-hop on-tree neighbors of every neighbor in N(v)

without exchanging "Hello" messages with the neighbors. That is, v knows TN(N(v)), which is at least part of its 2-hop neighbors N2(v).

The following procedure provides an example of a method of communicating information in a communication network according to the present invention.

Optimal On-tree Forward Node Selection Procedure (OOS):

Part-I: Determine the set of nodes that are to be covered by the rebroadcasts of forwarding nodes to be selected by node v.

If v is the source of the broadcast packet
{

$$S(v)=N(v)-v, \quad (1)$$

$$C(v)=TN(N(v))-N(v), \quad (2)$$

}
Else v must receive the broadcast packet from another node u
{

$$S(v)=N(v)-v-TN(u), \quad (3)$$

$$C(v)=TN(N(v))-N(v)-TN2(u), \quad (4)$$

If v also knows F(u) from the broadcast packet
{

$$S(v)=N(v)-v-TN(u)-F(u), \quad (5)$$

$$C(v)=TN(N(v))-N(v)-TN2(u)-TN(F(u)), \quad (6)$$

}
}
Initialize $F(v)=\Phi$.

Part-II: Identify a node set with minimum number of forwarding nodes by node v.

Construct a forest composed of all nodes in $S(v) \cup C(v)$.

For every tree in the forest
{
  For every level in the tree, starting from the bottom,
  {
    For every node $w \in C(v)$, from left to right
    {
      If $x=Parent(w) \in S(v)$
      {

$F(v)=F(v) \cup \{x\}$, $S(v)=S(v)-\{x\}$, $C(v)=C(v)-TN(x)$.

}
      Else there must exist $y \in S(v)$ such that $w=Parent(y)$
      {

$F(v)=F(v) \cup \{y\}$, $S(v)=S(v)-\{y\}$, $C(v)=C(v)-\{w\}$.

}
    }
  }
}

The correctness and optimality of the above method is proved herein based on the following two lemmas.

Lemma 1: The set S in (1), (3), and (5) will on-tree cover the set C in (2), (4), and (6), and $S \cap C = \Phi$, respectively.

Proof: We will only prove that set S defined in (5) on-tree covers set C defined in (6).

Noticing that $N(X)-N(Y) \subseteq N(X-Y)$ for any two sets X and Y, and $TN(v) \subseteq N(v)$, we get $C \subseteq TN(N(v))-TN(v)-TN2(u)-TN(F(u)) \subseteq TN(N(v)-v-TN(u)-F(u))=TN(S)$ For any node $x \in S$, we have $x \in N(v)$ and $x \notin C$. Hence we have $S \cap C = \Phi$.

Lemma 2: For any sets S and C such that S on-tree covers C and $S \cap C = \Phi$, the forwarding set, F(v), selected by Part-II covers set C, and set F(v) has the minimal number of nodes among all possible forwarding sets.

Proof: Given S and C such that $C \subseteq TN(S)$, Part-II procedure first constructs a group of trees, called a forest, of $S \cup C$. Since trees in the forest are not connected, every node in one tree cannot on-tree cover or be on-tree covered by any node in other trees. So we only need to consider every tree separately.

In the second section of Part-II procedure for the bottom level of a tree, from left to right, every node w is processed as follows: If $w \in C$, its parent node x must belong to set S and be selected to on-tree cover w because $C \subseteq TN(S)$ and no children of w is on this tree. As a result, w will be removed from set C. At the bottom level, only a minimum number of forwarding nodes are selected.

To apply mathematical induction, we assume that k levels from the bottom have been processed and a minimum number of forwarding nodes have been selected so far. Now at level k+1 from the bottom, for any node w, its existing descendents must belong to set S. If $w \in C$, since $C \subseteq TN(S)$, w can be covered by its parent node $x \in S$ and/or one of its children, say $y \in S$.

X is selected if $x \in S$. Y is selected when $x \notin S$. In both cases, one forwarding node is selected to on-tree cover w. When $x \in S$ and selected, it will cover its parent and all its other children in the current level, including w, if they belong to C; but if y is selected, it is only used to cover w because all its children in C have already been processed and removed from C. So y is selected only when $x \in S$ does not exist.

Figure 3:
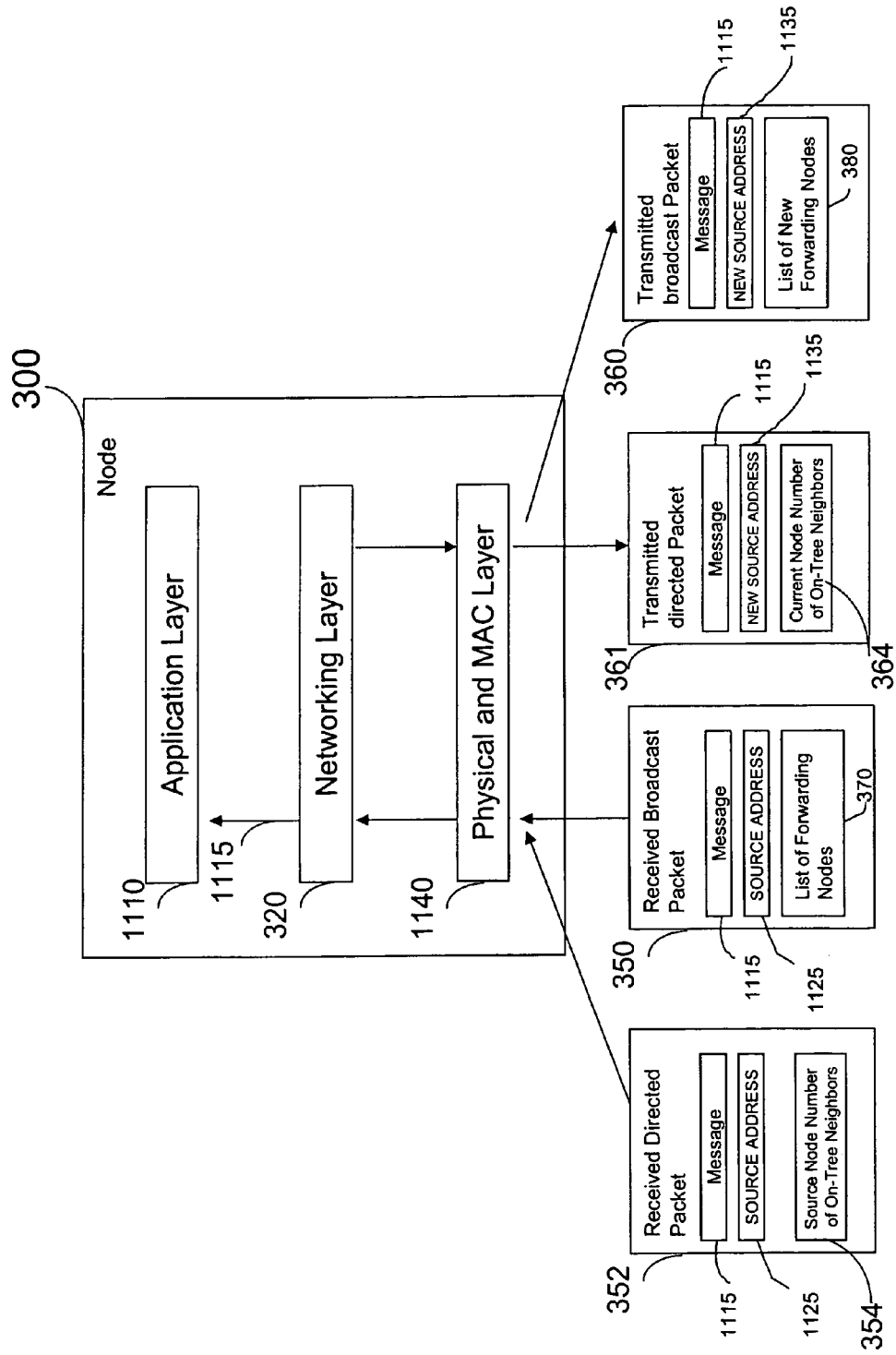
FIG. 3 shows an embodiment of a node according to the present invention.

FIG. 3 shows an example of a node 300, which is an embodiment of a node and of a node operating in a communication network system according to the present invention. The node 300 includes a physical and MAC layer 1140 that receives broadcast packets 350 and directed packets 352 transmitted from other nodes in the network. Each received directed packet 352 includes a message 1115, a source address 1125, and a number of source node on-tree neighbors 354 (i.e., a number of nodes that have a parent or child relationship with the node that transmit the directed packet). Each received broadcast packet 350 includes a message 1115, a source address 1125 and a list of forwarding nodes 370. The physical and MAC layer 1140 passes each received packet 350/352 to the networking layer 320, and the networking layer 320 determines a forwarding strategy for received broadcast packets 350. If the current node 300 is listed within the list of forwarding nodes 370, the current node 300 performs forward node selection, as described below. The message 1115 is passed to the application layer 1110 by the networking layer 320. The networking layer 320 also forms a new broadcast packet 360 that includes a list of new forwarding nodes 380, which is broadcast by the physical and MAC layer 340. If the current node 300 is not listed within the list of forwarding nodes 370 in received broadcast packet 350, the network layer 320 only passes the message information 1115 to the application layer 1110, and does not generate a new packet 360. Physical and MAC layer 1140 also forms a directed packet 361 including a message 1115 and a new source address 1135. The directed packet also includes a current node number of on-tree neighbor nodes 364, which is a number of nodes that have a parent or child relationship with the current node (i.e., node 300).

Figure 4:
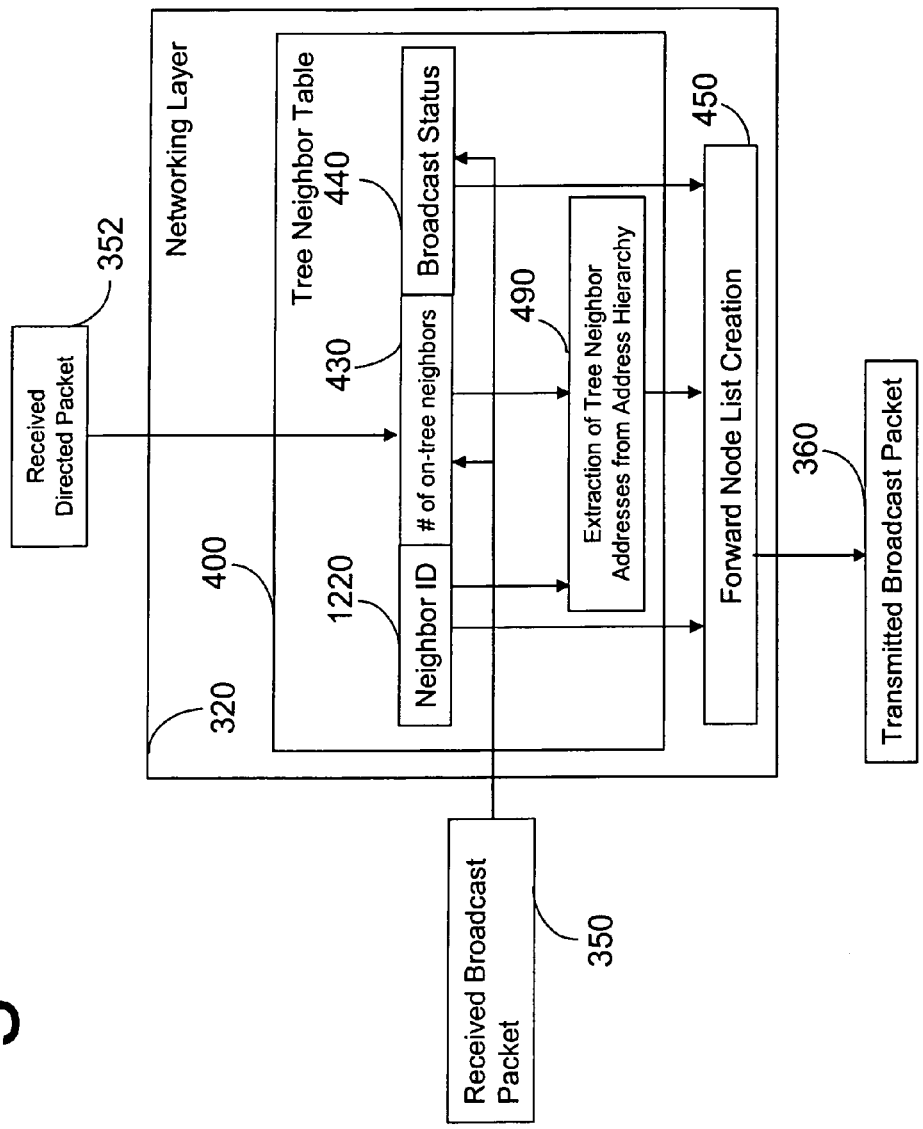
FIG. 4 shows an embodiment of a networking layer in a node according to an embodiment of the present invention.

FIG. 4 shows an embodiment of a networking layer 320, according to the present invention. In this embodiment, a stored table, for example tree neighbor table 400, does not need to store or receive a full 1-hop neighbor list 830 from its neighbors, as in the background method. Instead, only the number of on-tree neighbors 430 of a neighbor 1220 in the neighbor children table 400, are required. The number of on-tree neighbors 430 from the received directed data packets 352 is stored in the neighbor children table 400. Further, broadcast status 440 is determined from received broadcast packets 350. Addresses of on-tree neighbor nodes are then determined from tree connectivity and hierarchical addressing scheme of the network in block 490, based on the neighbor ID 1220 and the number of on-tree neighbors 430. The forward node list creation unit 450, according to the example of FIG. 4, uses neighbor IDs 1220, their number of on-tree neighbors 430 and the broadcast status 440 to determine a new list of forwarding nodes 380, which is to be transmitted (e.g., rebroadcast) in packet 360. Neighbor IDs 1220 having broadcast status 440 already set to 1 are removed from the forwarding list 380 by the Forward Node List Creation Unit 450.

Thus, as illustrated in the example of FIG. 4, nodes according to the present invention advantageously determine the forwarding node list without broadcasting a table of 1-hop neighbors and without using "Hello" messages that include full lists of 1-hop neighbors.

Figure 5:
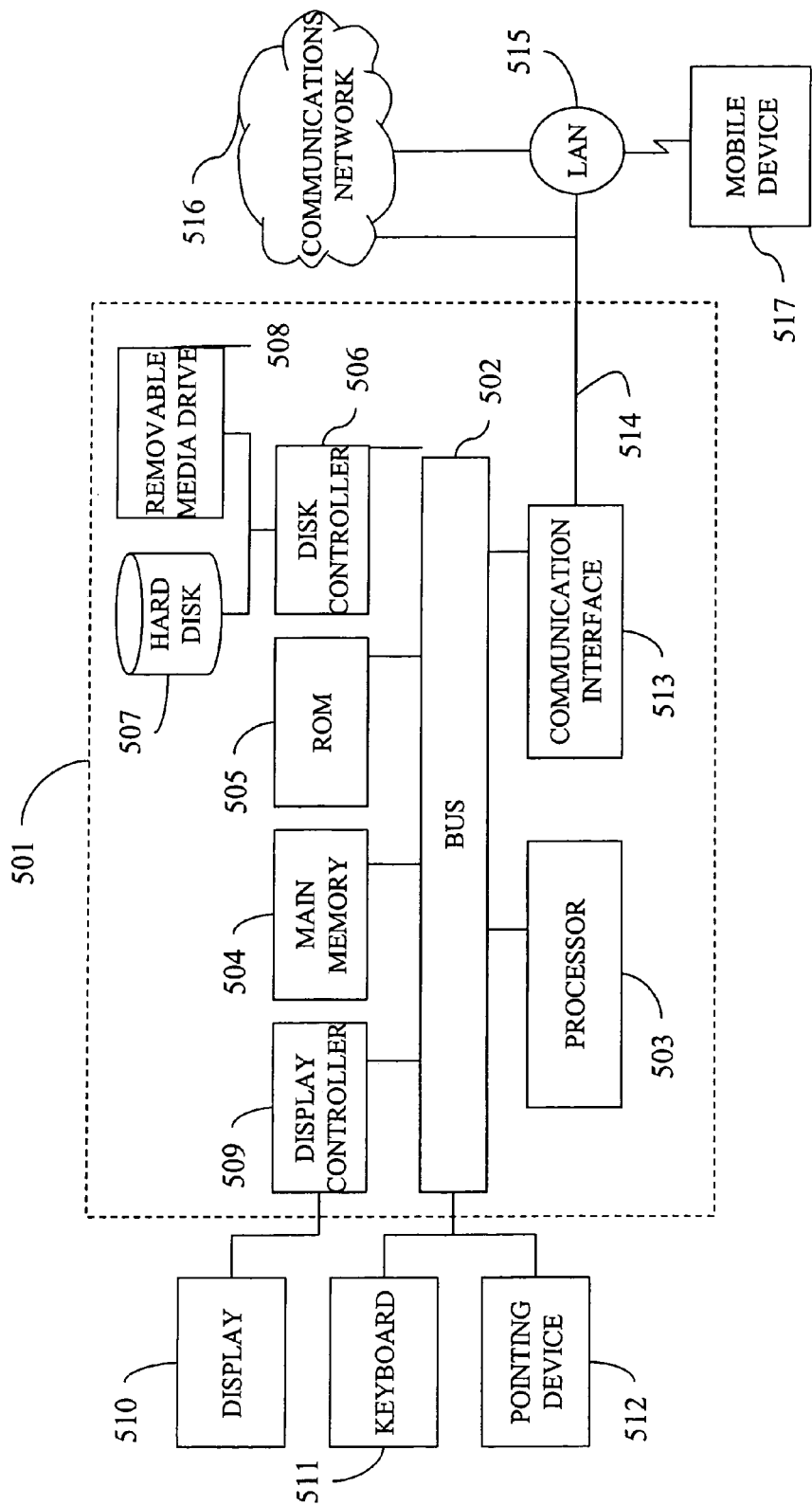
FIG. 5 illustrates a computer upon which an embodiment of the present invention may be implemented.

FIG. 5 illustrates a computer system 501 upon which an embodiment of the present invention may be implemented. The computer system 501 includes a bus 502 or other communication mechanism for communicating information, and a processor 503 coupled with the bus 502 for processing the information. The computer system 501 also includes a main memory 504, such as a random access memory (RAM) or other dynamic storage device (e.g., dynamic RAM (DRAM), static RAM (SRAM), and synchronous DRAM (SDRAM)), coupled to the bus 502 for storing information and instructions to be executed by processor 503. In addition, the main memory 504 may be used for storing temporary variables or other intermediate information during the execution of instructions by the processor 503. The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, flash memory drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 501 may also include a display controller 509 coupled to the bus 502 to control a display 510, such as a cathode ray tube (CRT), for displaying information to a computer user. The computer system includes input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing steps of the invention in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 501, for driving a device or devices for implementing the invention, and for enabling the computer system 501 to interact with a human user (e.g., print production personnel). Such software may include, but is not limited to, device drivers, operating systems, development tools, and applications software. Such computer readable media further includes the computer program product of the present invention for performing all or a portion (e.g., locally portion of distributed processing) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed or centralized for better performance, reliability, and/or cost.

The term "computer readable medium" as used herein refers to any medium that participates in providing instructions to the processor 503 for execution. A computer readable medium may take many forms, including but not limited to, non-volatile media, volatile media, and transmission media. Non-volatile media includes, for example, optical, magnetic disks, flash memory, and magneto-optical disks, such as the hard disk 507 or the removable media drive 508. Volatile media includes dynamic memory, such as the main memory 504. Transmission media includes coaxial cables, copper wire and fiber optics, including the wires that make up the bus 502. Transmission media also may also take the form of acoustic or light waves, such as those generated during radio wave and infrared data communications.

Various forms of computer readable media may be involved in carrying out one or more sequences of one or more instructions to processor 503 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 501 may receive the data on the telephone line and use an infrared transmitter to convert the data to an infrared signal. An infrared detector coupled to the bus 502 can receive the data carried in the infrared signal and place the data on the bus 502. The bus 502 carries the data to the main memory 504, from which the processor 503 retrieves and executes the instructions. The instructions received by the main memory 504 may optionally be stored on storage device 507 or 508 either before or after execution by processor 503.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a network interface card to attach to any packet switched LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc). The signals through the various networks and the signals on the network link 514 and through the communication interface 513, which carry the digital data to and from the computer system 501 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, or cellular telephone.

Figure 6:
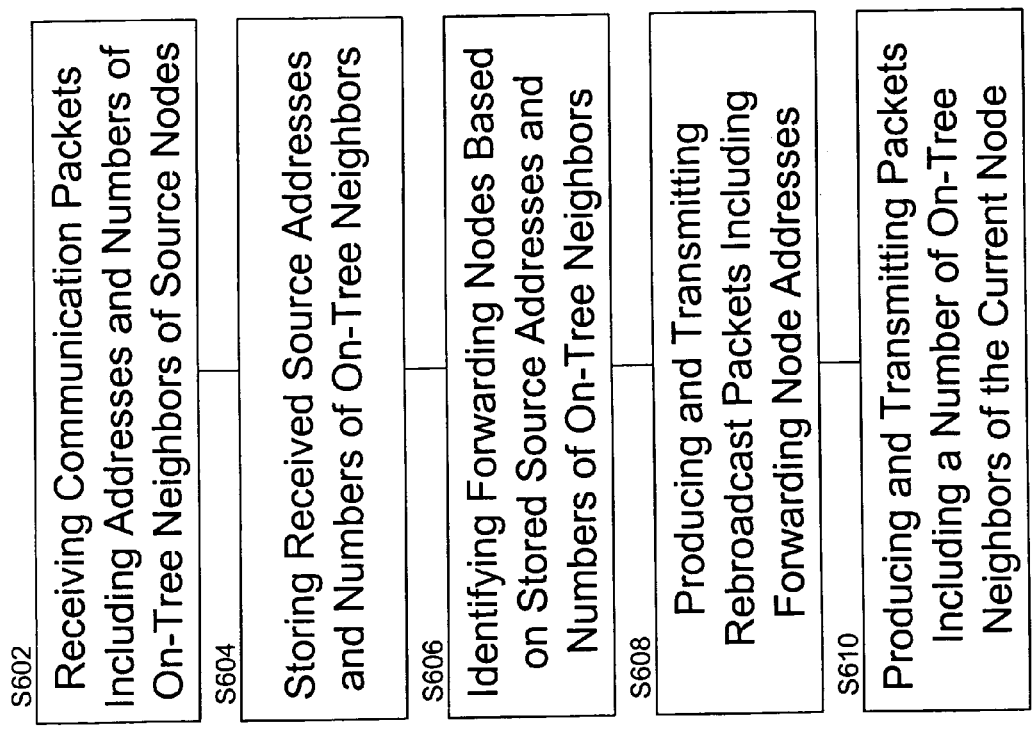
FIG. 6 illustrates a method of communicating in a network according to an embodiment of the present invention.

FIG. 6 is a block diagram showing an example of a method of communicating information in a communication network according to an embodiment of the present invention. In Step S602, communication packets are received by the current node. The communication packets identify source addresses and a number of on-tree neighbor nodes of neighbor nodes transmitting the received packets. On-tree neighbor nodes of 1-hop neighbor nodes are those nodes that have a parent or child relationship with the respective 1-hop neighbor node (e.g., a neighbor node within a communication range of the current node). The communication packets also identify forwarding node addresses of forwarding nodes from which the received packets are to be rebroadcast. In Step S604, received numbers of on-tree neighbor nodes and source addresses are stored for each neighbor node transmitting the received packets. In Step S606, the method identifies forwarding nodes based on the stored source addresses and stored number of on-tree neighbors of neighbor nodes identified in the received communication packets. Step S608 includes producing and transmitting a rebroadcast packet that includes the addresses of the forwarding nodes, which are the nodes that are instructed to forward the rebroadcast packet upon receipt. In Step S10, the method produces and transmits a directed packet from current node. The directed communication packet includes the address of the current node as a source address as well as a number of on-tree neighbors of the current node.

Figure 7:
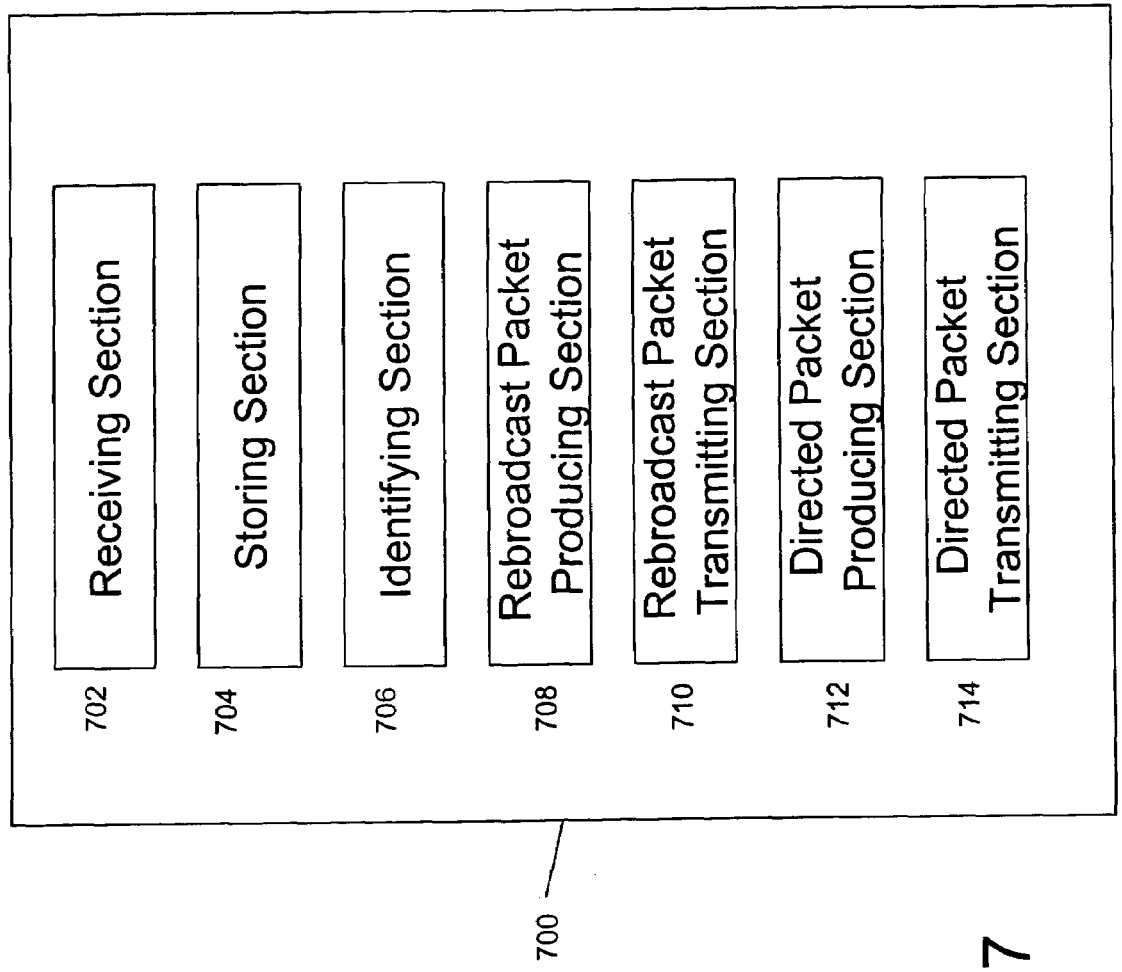
FIG. 7 shows a further embodiment of a node according to the present invention.

FIG. 7 is a block diagram showing an example of a node configured to communicate information or a node in a communication system according to an embodiment of the present invention. A receiving section 702 receives packets. The communication packets identify source addresses and a number of on-tree neighbor nodes of neighbor nodes transmitting the received packets. On-tree neighbor nodes of 1-hop neighbor nodes are those nodes that have a parent or child relationship with the respective 1-hop neighbor node (e.g., a neighbor node within a communication range of the current node). The communication packets also identify forwarding node addresses of forwarding nodes from which the received packets are to be rebroadcast. The storing section 704 stores the received numbers of on-tree neighbor nodes and source addresses for each neighbor node transmitting the received packets. The identifying section 706 identifies forwarding nodes based on the stored source addresses and stored number of on-tree neighbors of neighbor nodes identified in the received communication packets. Forwarding nodes are nodes instructed to forward a rebroadcast packet sent by the current node. The rebroadcast packet producing section 708 produces rebroadcast packets that include the addresses of the forwarding nodes identified in the identifying section. The rebroadcast packet transmitting section transmits the rebroadcast packet produced in the rebroadcast packet producing section 708. The directed packet producing section 712 produces directed packets including the address of the current node as a source address as well as a number of on-tree neighbors of the current node, and the directed packet transmitting section 714 transmits the directed packet produced by the directed packet producing section 712.

Figure 8:
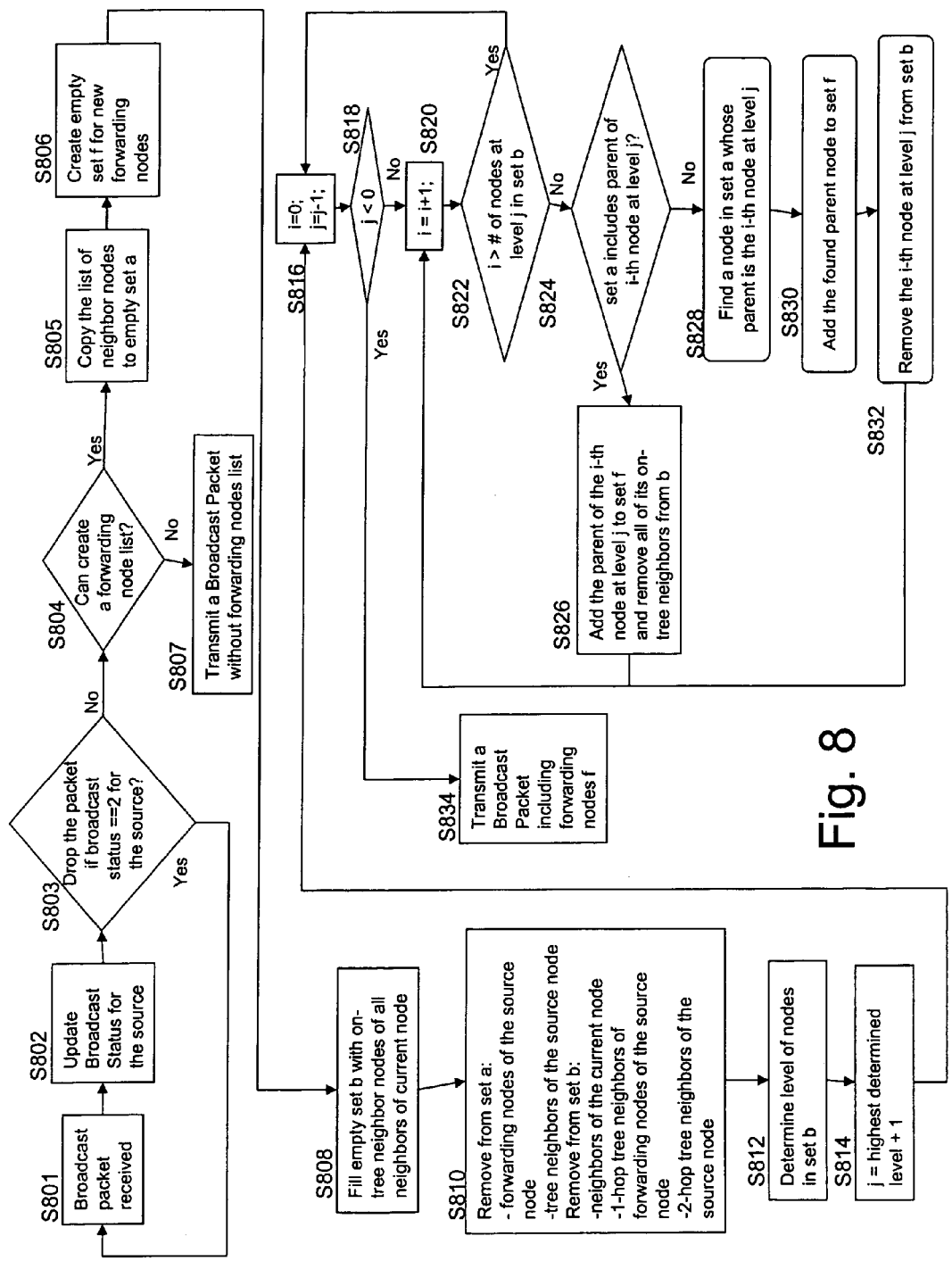
FIG. 8 shows a further embodiment of a method of communicating information in a communication network according to an embodiment of the present invention.

FIG. 8 illustrates another example of a method to communicate information in a communication network, according to an embodiment of the present invention. In step S801, broadcast packets are received with or without forwarding nodes identified by the node that sent the received packet (i.e., source node). In step S802, a stored broadcast status for the source node is updated. In step S803, if a stored broadcast status for the source node updated in S802 is 2, drop the packet and proceed to step S801, otherwise proceed to step S804. In step S804, if a forwarding list can be created proceed to step S805, otherwise proceed to step S807. In step S807, transmit a broadcast packet without a list of forwarding nodes. In step S805, a list of neighbor nodes of the current node collected by eavesdropping on communication between neighbor nodes and other nodes (not shown) is copied to an empty set a. In step S806, an empty set f is created to store new forwarding nodes. In step S808, an empty set b is created and then populated with on-tree neighbors of the current node. The on-tree neighbors of the current node are determined by eavesdropping on communication between neighbor nodes and the current node (not shown) and by the hierarchical structure of the network (not shown). In step S810, remove the following nodes from set a: forwarding nodes of the source node of the received broadcast packet and on-tree neighbors of the source node of the received broadcast packet. Further, in step S810, remove the following nodes from set b: neighbors of the current node, 1-hop on-tree neighbors of nodes identified as forwarding nodes of the source node, if any, and 2-hop on-tree neighbors of the source node. In step S812, determine the hierarchical level of nodes in set b. For example, the hierarchical level of nodes at the top of the tree is 0. In step S814, set variable j to one greater than the highest determined hierarchical level of nodes in set b. In step S816, set variable i to 0 and decrement j. In step S818, if j<0 is true, proceed to step S834, otherwise proceed to step S820. In step S834, transmit (i.e., rebroadcast) a packet including the set of forwarding nodes f.

In step S820, increment the variable i (i.e, i=i+1). Variable i will be used in the subsequent steps to identify a node at level j. For example, if there are three nodes at level j, i=0 identifies the first node at level j, i=1 identifies the second node at level j and i=2 identifies the third node at level j. In step S822, if i is greater than a number of nodes at hierarchical level j (determined in step S812), then proceed to step S816, otherwise, proceed to set S824. In step S824, if the i-th element at level j is in set a, proceed to step S826, otherwise proceed to step S828. In step S826, add the parent of the i-th node at level j to the forwarding node set f, remove all on-tree neighbors of the i-th node at level j from set b and proceed to step S820.

In step S828, find a node in set a whose parent is the i-th node at level j. In step S830, add the node found in step S828 to the forwarding set f. In step S832, remove the i-th node at level j from set b and proceed to step S820.

Figure 9:
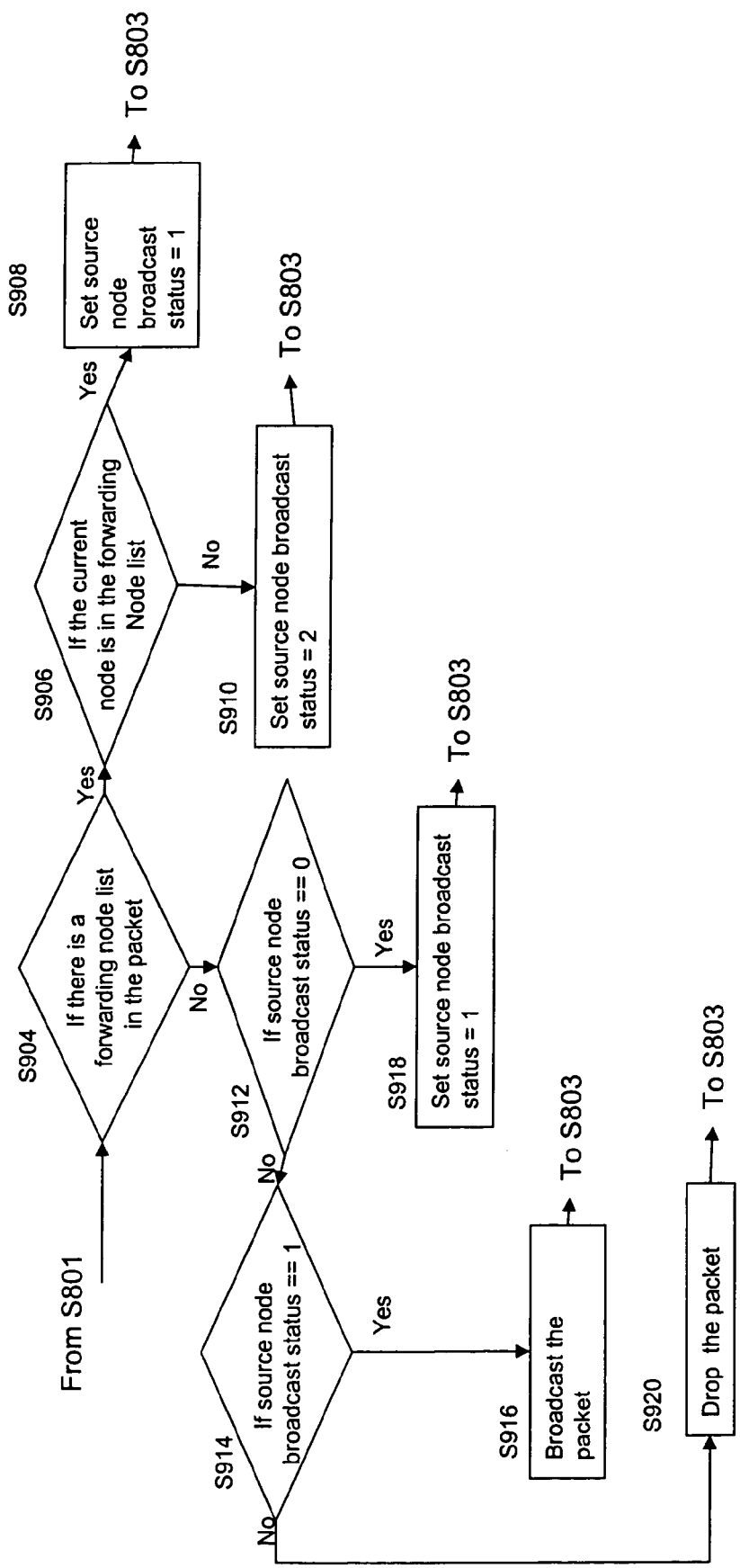
FIG. 9 shows a method of setting a broadcast status according to an embodiment of the present invention.

FIG. 9 further illustrates a method of determining if a packet should be rebroadcast when communicating information in a communication network, as in step S802 of FIG. 8, and in accordance with the present invention. In step S904, if the received broadcast node includes forwarding nodes, proceed to step S906, otherwise proceed to step S912. In step S906, if the current node is in the forwarding nodes, proceed with step S908, otherwise proceed to step S910. In step S908, set the stored broadcast status of the source node to 1 and proceed to step S803. In step S910, drop the packet (i.e., do not transmit a broadcast packet), set the stored broadcast status of the source node to 2, and proceed to step S803. In step S912, if the stored broadcast status of the source node is 0, proceed to step S918, otherwise proceed to step S914. In step S918, set the stored broadcast status of the source node to 1 and proceed to step S803. In step S914, if the stored source node broadcast status is 1, proceed to step S916, otherwise proceed to step S920. In step S916, broadcast the packet and proceed to step S803. In step S920, drop the packet and proceed to step S803.

Figure 10:
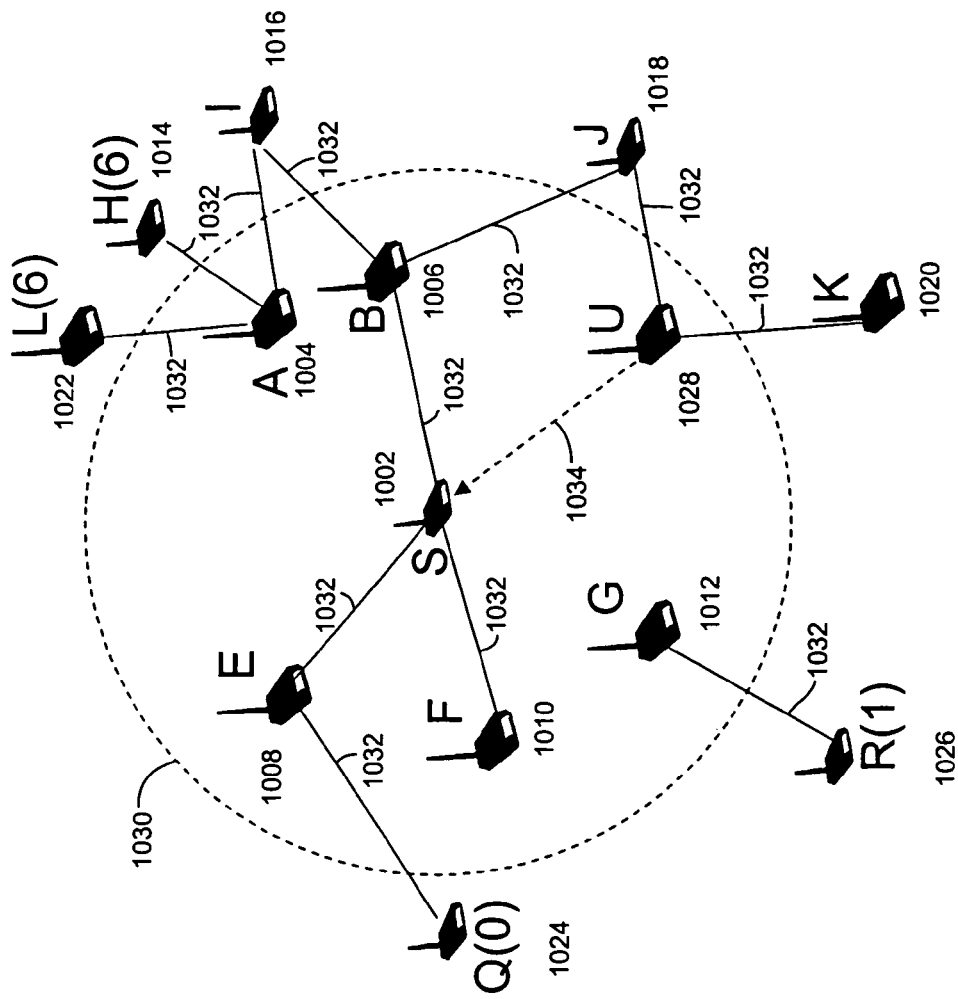
FIG. 10 shows an example of communicating information in a communication network according to an embodiment of the present invention.
Figure 11:
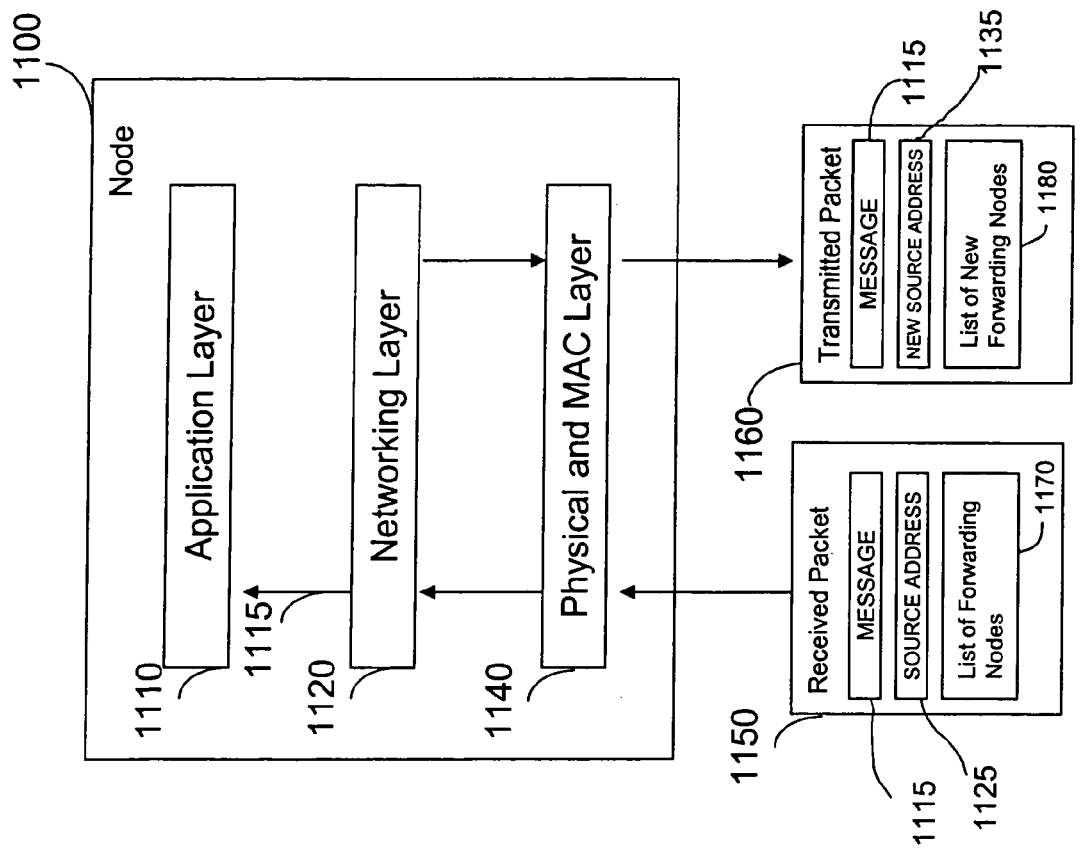

FIG. 10 represents an example of a communication network system according to the present invention. The communication network system of the present example includes communication nodes S 1002, A 1004, B 1006, E 1008, F 1010, G 1012, H(6) 1014, I 1016, J 1018, K 1020, L(6) 1022, Q(0) 1024, R(1) 1026 and U 1028. Parenthetical numbers with some node names indicate the hierarchical level of that node. Tree connections between nodes with parent or child relationships are represented by solid lines 1032. 1-hop neighbors of node S 1002 are the nodes within dashed circle 1030. In this example, node S 1020 receives a broadcast packet from a source node U 1028 as represented by dashed line 1034. Forwarding nodes selected by U 1028 and included in the broadcast packet are {S 1002, B 1006, K 1020}. In the following discussion, reference numbers and parenthetical identifiers for the nodes in this example are omitted for brevity and clarity. For example, it is to be understood that H refers to node H(6) 1014, as shown in the example of FIG. 10.

Candidate forwarding node set of node S is initially all neighbors of node S except node S itself: a={A, B, E, F, G, U}, and the to-be-covered set of node S (the nodes to be covered by forwarding nodes identified by S) is initially set to all tree neighbors of all neighbors of node S: b={L, H, I, S, J, K, R, Q}. According to step S810 of FIG. 8, the following nodes are removed from set a: forwarding nodes {S, B, K} of the source node U, and the tree neighbors of the source node U: {U, J, K}, resulting in a={A, E, F, G}. Further, according to the removing step S810 of FIG. 8, the following nodes are removed from set b: neighbors of node S: {S, A, B, E, F, G, U}, the 1-hop on-tree neighbors of forwarding nodes {S, B, K} of source node U: {B, E, F, I, J, S, K, U}, and the 2-hop on-tree neighbors of the source node U: {U, J, K, B}, resulting in b={H, L, Q, R}. The forwarding node set F of node S is initially empty. The hierarchical levels of nodes in b are sorted such that at level 6 are H and L, at level 1 is R and at level 0 is Q.

At level 6, H is processed first. Since H's parent node A belongs to a, as in step S824, node A is selected as a forwarding node and node A's tree neighbors {H, L, I} are removed from b, as in step S826. As for R, since node R's parent is not in set a, its child node G in set a is selected as a forwarding node. At level 0, Q is processed. Since node Q's parent is not in set a, as in step S826, node Q's child node E is found in set a and node E is selected as a forwarding node. All the nodes in set b have been processed and the forwarding nodes in this example are found to be F={A, E, G}.

Background methods assume that each node includes two-hop neighbor information, including all the addresses of all the nodes within 2-hop communication range, and the methods retrieve this information by using periodic "Hello" messages to exchange 1-hop neighbor lists of each node. However, the present invention does not need to use "Hello" messages to exchange information between nodes. Each node knows the addresses of its 1-hop neighbors by listening to transmissions of 1-hop neighbors when they communicate with other nodes.

The present invention includes a distributed method and assumes that every node maintains a 1-hop neighbor table. In particular, the present invention applies to networks in which node addresses are hierarchically assigned during network formation. The forward node selection method in the present invention takes advantage of the hierarchical address space in such networks to predict a partial list of 2-hop neighbors. A polynomial time and space complexity algorithm of the present invention finds the minimal number of forward nodes to cover these partial 2-hop neighbors and covers the whole network in a short number of steps. Accordingly, knowledge of position is not required for the success, and nodes do not change their transmit power level to control topology.

The present invention introduces a method for forward node selection that can be used to ensure that all nodes in a network receive a broadcast message. A source node initiates data broadcasting by broadcasting a message. From its 1-hop neighbors, which are the nodes within the source's communication range, the source node selects neighbor nodes that should rebroadcast the message. The addresses of these selected nodes are included in the original broadcast message transmitted by the source. Every node that receives the broadcast message, if selected by the source, first selects its own forwarding nodes and rebroadcasts the message. The nodes drop the broadcast message if received more than once. The present invention uses hierarchically distributed network addresses to determine 1-hop neighbor nodes that have a number of 1-hop neighbors greater than a threshold. Those nodes are selected as the forwarding nodes. This selection and forwarding procedure is repeated at every forwarding node.

The present invention relates to a method that selects a minimum number of forwarding nodes at each hop during network wide data broadcasting in wireless ad-hoc and/or sensor networks. The node designated method in the present invention lowers the number of broadcast transmissions more than 60% compared to the background best effort flooding in which every node in the network transmits the data broadcast packet at least once. Minimization of the broadcast transmissions is important in wireless sensor networks, for example, for several reasons: to avoid excess traffic, to lower number of collisions and retransmissions and hence to increase achievable throughput, and to maintain long battery life-time because every data transmission consumes battery power of a device. In sensor networks, data broadcasting is needed to set and get attributes of the devices in the network, which determine the operational behavior of devices. For instance, to send every device in a sensor network into a sleep mode for a specified duration requires network wide broadcast of a corresponding command. Further, efficient data broadcasting protocol at the networking layer of short range wireless devices for sensor network applications is also a desired feature.

Numerous modifications and variations of the present invention are possible in light of the above teachings. It is therefore to be understood that within the scope of the appended claims, the invention may be practiced otherwise than as specifically described herein.

The invention claimed is:

1. A method of communicating information in a communication network including a plurality of hierarchically addressed nodes each including a child or parent hierarchical address relationship in which an address of each child node includes information identifying an address of a parent node, the method comprising:
(a) receiving at a current node communication packets transmitted from 1-hop neighbor nodes within a communication range of the current node, said communication packets identifying (1) 1-hop neighbor node addresses of the respective 1-hop neighbor nodes transmitting the packets, (2) a number defining how many on-tree neighbor nodes have the child or parent hierarchical address relationship with the respective 1-hop neighbor nodes transmitting the packets, and (3) forwarding node addresses of forwarding nodes from which the received packets are to be rebroadcast;
(b) storing said 1-hop neighbor node addresses and said number of on-tree neighbor nodes;
(c) when a received packet at the current node identifies the current node as a forwarding node which should rebroadcast the received packet, identifying based on the stored 1-hop neighbor addresses and the stored number of on-tree neighbor nodes, each 1-hop neighbor node which should be a forwarding node instructed to rebroadcast information included in a communication packet received from the current node;
(d) producing at the current node a rebroadcast communication packet including information to be rebroadcast, an address of the current node, and addresses of forwarding nodes identified in step (c) when the received packet at the current node identifies the current node as a forwarding node which should rebroadcast the received information; and
(e) transmitting from the current node the rebroadcast communication packet produced in step (d).

2. The method of claim 1, further comprising:
producing at the current node a communication packet identifying a number defining how many 1-hop neighbor nodes have the child or parent hierarchical address relationship with the current node; and
transmitting the communication packet identifying the defined number of 1-hop neighbor nodes having the child or parent hierarchical address relationship with the current node.

3. The method of claim 1, wherein step (a) comprises:
(a-1) receiving at the current node non-directed communication packets from 1-hop neighbor nodes, including information intended to be received by each node in the plurality of hierarchically addressed nodes, said 1-hop neighbor addresses of the respective 1-hop neighbor nodes transmitting the non-directed packets, and said forwarding node addresses of forwarding nodes from which the information in received non-directed packets are to be rebroadcast; and
(a-2) receiving at the current node directed communication packets including information intended to be received by a subset of nodes in the plurality of hierarchically addressed nodes, said 1-hop neighbor addresses of the respective 1-hop neighbor nodes transmitting the directed packets, and said number defining how many on-tree neighbor nodes have the child or parent hierarchical address relationship with the respective 1-hop neighbor nodes transmitting the packets.

4. The method of claim 3, further comprising:
storing a broadcast indication for the respective 1-hop neighbor nodes transmitting the non-directed packets,
wherein the identifying in step (c) is further based on the stored broadcast indication for each 1-hop neighbor node.

5. The method of claim 1, further comprising:
identifying on-tree neighbor nodes having the child or parent hierarchical address relationship with each 1-hop neighbor node; and
determining, for each 1-hop neighbor node and each identified on-tree neighbor node, a hierarchical level indicating a number of nodes between a respective node and a root node,
wherein the identifying in step (c) is further based on the determined hierarchical level.

6. The method of claim 5, wherein the step of identifying on-tree neighbor nodes further comprises:

excluding 1-hop neighbor nodes of the current node from the identified on-tree neighbor nodes considered in the determining in step (c).

7. The method of claim 5, wherein step (c) comprises:
(c-1) identifying a 1-hop neighbor node as a forwarding node if the 1-hop neighbor node is a parent node of an identified on-tree neighbor node;
(c-2) excluding the parent node and other child nodes of the 1-hop neighbor node identified in step (c-1) from the identified on-tree neighbor nodes considered in the determining step (c).

8. The method of claim 5, wherein step (c) comprises:
(c-1) identifying a 1-hop neighbor node as a forwarding node if the 1-hop neighbor node is a child node of an identified on-tree neighbor node and the identified on-tree neighbor node is not a 1-hop neighbor node of the current node.

9. The method of claim 2, wherein step (a) comprises:
(a-1) receiving at the current node non-directed communication packets from 1-hop neighbor nodes, including information intended to be received by each node in the plurality of hierarchically addressed nodes, said 1-hop neighbor addresses of the respective 1-hop neighbor nodes transmitting the non-directed packets, and said forwarding node addresses of forwarding nodes from which the information in received non-directed packets are to be rebroadcast; and
(a-2) receiving at the current node directed communication packets including information intended to be received by a subset of nodes in the plurality of hierarchically addressed nodes, said 1-hop neighbor addresses of the respective 1-hop neighbor nodes transmitting the directed packets, and said number defining how many on-tree neighbor nodes have the child or parent hierarchical address relationship with the respective 1-hop neighbor nodes transmitting the packets.

10. The method of claim 9, further comprising:
storing a broadcast indication for the respective 1-hop neighbor nodes transmitting the non-directed packets,
wherein the identifying in step (c) is further based on the stored broadcast indication for each 1-hop neighbor node.

11. The method of claim 2, further comprising:
identifying on-tree neighbor nodes having the child or parent hierarchical address relationship with each 1-hop neighbor node; and
determining, for each 1-hop neighbor node and each identified on-tree neighbor node, a hierarchical level indicating a number of nodes between a respective node and a root node,
wherein the identifying in step (c) is further based on the determined hierarchical level.

12. The method of claim 11, wherein the step of identifying on-tree nodes further comprises:
excluding 1-hop neighbor nodes of the current node from the identified on-tree neighbor nodes considered in the determining in step (c).

13. The method of claim 11, wherein step (c) comprises:
(c-1) identifying a 1-hop neighbor node as a forwarding node if the 1-hop neighbor node is a parent node of an identified on-tree neighbor node;
(c-2) excluding the parent node and other child nodes of the 1-hop neighbor node identified in step (c-1) from the identified on-tree neighbor nodes considered in the determining step (c).

14. The method of claim 11, wherein step (c) comprises:
(c-1) identifying a 1-hop neighbor node as a forwarding node if the 1-hop neighbor node is a child node of an identified on-tree neighbor node and the identified on-tree neighbor node is not a 1-hop neighbor node of the current node.

15. The method of claim 3, further comprising:
identifying on-tree neighbor nodes having the child or parent hierarchical address relationship with each 1-hop neighbor node; and
determining, for each 1-hop neighbor node and each identified on-tree neighbor node, a hierarchical level indicating a number of nodes between a respective node and a root node,
wherein the identifying in step (c) is further based on the determined hierarchical level.

16. The method of claim 15, wherein the step of identifying on-tree nodes further comprises:
excluding 1-hop neighbor nodes of the current node from the identified on-tree neighbor nodes considered in the determining in step (c).

17. The method of claim 15, wherein step (c) comprises:
(c-1) identifying a 1-hop neighbor node as a forwarding node if the 1-hop neighbor node is a parent node of an identified on-tree neighbor node;
(c-2) excluding the parent node and other child nodes of the 1-hop neighbor node identified in step (c-1) from the identified on-tree neighbor nodes considered in the determining step (c).

18. The method of claim 15, wherein step (c) comprises:
(c-1) identifying a 1-hop neighbor node as a forwarding node if the 1-hop neighbor node is a child node of an identified on-tree neighbor node and the identified on-tree neighbor node is not a 1-hop neighbor node of the current node.

19. The method of claim 4, further comprising:
identifying on-tree neighbor nodes having the child or parent hierarchical address relationship with each 1-hop neighbor node; and
determining, for each 1-hop neighbor node and each identified on-tree neighbor node, a hierarchical level indicating a number of nodes between a respective node and a root node,
wherein the identifying in step (c) is further based on the determined hierarchical level.

20. The method of claim 19, wherein the step of identifying on-tree nodes further comprises:
excluding 1-hop neighbor nodes of the current node from the identified on-tree neighbor nodes considered in the determining in step (c).

21. The method of claim 19, wherein step (c) comprises:
(c-1) identifying a 1-hop neighbor node as a forwarding node if the 1-hop neighbor node is a parent node of an identified on-tree neighbor node;
(c-2) excluding the parent node and other child nodes of the 1-hop neighbor node identified in step (c-1) from the identified on-tree neighbor nodes considered in the determining step (c).

22. The method of claim 19, wherein step (c) comprises:
(c-1) identifying a 1-hop neighbor node as a forwarding node if the 1-hop neighbor node is a child node of an identified on-tree neighbor node and the identified on-tree neighbor node is not a 1-hop neighbor node of the current node.

23. The method of claim 9, further comprising:
identifying on-tree neighbor nodes having the child or parent hierarchical address relationship with each 1-hop neighbor node; and
determining, for each 1-hop neighbor node and each identified on-tree neighbor node, a hierarchical level indicating a number of nodes between a respective node and a root node,
wherein the identifying in step (c) is further based on the determined hierarchical level.

24. The method of claim 23, wherein the step of identifying on-tree nodes further comprises:
excluding 1-hop neighbor nodes of the current node from the identified on-tree neighbor nodes considered in the determining in step (c).

25. The method of claim 23, wherein step (c) comprises:
(c-1) identifying a 1-hop neighbor node as a forwarding node if the 1-hop neighbor node is a parent node of an identified on-tree neighbor node;
(c-2) excluding the parent node and other child nodes of the 1-hop neighbor node identified in step (c-1) from the identified on-tree neighbor nodes considered in the determining step (c).

26. The method of claim 23, wherein step (c) comprises:
(c-1) identifying a 1-hop neighbor node as a forwarding node if the 1-hop neighbor node is a child node of an identified on-tree neighbor node and the identified on-tree neighbor node is not a 1-hop neighbor node of the current node.

27. The method of claim 10, further comprising:
identifying on-tree neighbor nodes having the child or parent hierarchical address relationship with each 1-hop neighbor node; and
determining, for each 1-hop neighbor node and each identified on-tree neighbor node, a hierarchical level indicating a number of nodes between a respective node and a root node,
wherein the identifying in step (c) is further based on the determined hierarchical level.

28. The method of claim 27, wherein the step of identifying on-tree nodes further comprises:
excluding 1-hop neighbor nodes of the current node from the identified on-tree neighbor nodes considered in the determining in step (c).

29. The method of claim 27, wherein step (c) comprises:
(c-1) identifying a 1-hop neighbor node as a forwarding node if the 1-hop neighbor node is a parent node of an identified on-tree neighbor node;
(c-2) excluding the parent node and other child nodes of the 1-hop neighbor node identified in step (c-1) from the identified on-tree neighbor nodes considered in the determining step (c).

30. The method of claim 27, wherein step (c) comprises:
(c-1) identifying a 1-hop neighbor node as a forwarding node if the 1-hop neighbor node is a child node of an identified on-tree neighbor node and the identified on-tree neighbor node is not a 1-hop neighbor node of the current node.

31. A communication network system comprising:
a plurality of hierarchically addressed nodes each including a child or parent hierarchical address relationship in which an address of each child node includes information identifying an address of a parent node, each of said nodes including
a receiving section configured to receive at a current node communication packets transmitted from 1-hop neighbor nodes within a communication range of the current node, said communication packets identifying (1) 1-hop neighbor node addresses of the respective 1-hop neighbor nodes transmitting the packets, (2) a number defining how many on-tree neighbor nodes have the child or parent hierarchical address relationship with the respective 1-hop neighbor nodes transmitting the packets, and (3) forwarding node addresses of forwarding nodes from which the received packets are to be rebroadcast,
a storing section configured to store said 1-hop neighbor node addresses and said number of on-tree neighbor nodes,
an identifying section, when a received packet at the current node identifies the current node as a forwarding node which should rebroadcast the received packet, configured to identify based on the stored 1-hop neighbor node addresses and the stored number of on-tree neighbor nodes, each 1-hop neighbor node which should be a forwarding node instructed to rebroadcast a communication packet received from the current node,
a producing section configured to produce at the current node a rebroadcast communication packet including information to be rebroadcast, an address of the current node, and addresses of forwarding nodes identified in the identifying section when the received packet at the current node identifies the current node as a forwarding node which should rebroadcast the received information, and
a transmitting section configured to transmit the rebroadcast communication packet produced by the producing section.

32. The communication network system of claim 31, wherein each of said nodes further comprises:
a producing section configured to produce at the current node a communication packet identifying a number defining how many 1-hop neighbor nodes have the child or parent hierarchical address relationship with the current node; and
a transmitting section configured to transmit the communication packet identifying the defined number of 1-hop neighbor nodes having the child or parent hierarchical address relationship with the current node.

33. The communication network system of claim 31, wherein the receiving section comprises:
a non-directed receiving section configured to receive at the current node non-directed communication packets from 1-hop neighbor nodes, including information intended to be received by each node in the plurality of hierarchically addressed nodes, said 1-hop neighbor addresses of the respective 1-hop neighbor nodes transmitting the broadcast packets, and said forwarding node addresses of forwarding nodes from which information in the received non-directed packets are to be rebroadcast; and
a directed receiving section configured to receive at the current node directed communication packets including information intended to be received by a subset of nodes in the plurality of hierarchically addressed nodes, said 1-hop neighbor addresses of the respective 1-hop neighbor nodes transmitting the directed packets, and said number defining how many on-tree neighbor nodes have the child or parent hierarchical address relationship with the respective 1-hop neighbor nodes transmitting the packets.

34. The communication network system of claim 33, wherein each of said nodes further comprises:

a storing section configured to store a broadcast indication for the respective 1-hop neighbor nodes transmitting the broadcast packets, wherein the identifying in the identifying section is further based on the stored broadcast indication for each 1-hop neighbor node.

35. The communication network system of claim 31, wherein each of said nodes further comprises:

an identifying on-tree neighbor nodes section configured to identify on-tree neighbor nodes having the child or parent hierarchical address relationship with each 1-hop neighbor node; and a determining section configured, for each 1-hop neighbor node and each identified on-tree neighbor node, to determine a hierarchical level indicating a number of nodes between a respective node and a root node, wherein the identifying in the identifying section is further based on the determined hierarchical level.

36. The communication network system of claim 35, wherein the identifying on-tree neighbor nodes section further comprises:

an excluding 1-hop neighbor nodes section configured to exclude 1-hop neighbor nodes of the current node from the identified on-tree neighbor nodes considered in the identifying of the identifying section.

37. The communication network system of claim 35, wherein the identifying section comprises:

an parent node identifying section configured to identify a 1-hop neighbor node as a forwarding node if the 1-hop neighbor node is a parent node of an identified on-tree neighbor node;

an excluding parent and other child nodes section configured to exclude the parent node and other child nodes of the 1-hop neighbor node identified in the parent identifying section from the identified on-tree neighbor nodes considered in the identifying in the identifying section.

38. The communication network system of claim 35, wherein the identifying section comprises:

a child identifying section configured to identify a 1-hop neighbor node as a forwarding node if the 1-hop neighbor node is a child node of an identified on-tree neighbor node and the identified on-tree neighbor node is not a 1-hop neighbor node of the current node.

39. The communication network system of claim 32, wherein the receiving section comprises:

a non-directed receiving section configured to receive at the current node non-directed communication packets from 1-hop neighbor nodes, including information intended to be received by each node in the plurality of hierarchically addressed nodes, said 1-hop neighbor addresses of the respective 1-hop neighbor nodes transmitting the broadcast packets, and said forwarding node addresses of forwarding nodes from which information in the received non-directed packets are to be rebroadcast; and a directed receiving section configured to receive at the current node directed communication packets including information intended to be received by a subset of nodes in the plurality of hierarchically addressed nodes, said 1-hop neighbor addresses of the respective 1-hop neighbor nodes transmitting the directed packets, and said number defining how many on-tree neighbor nodes have the child or parent hierarchical address relationship with the respective 1-hop neighbor nodes transmitting the packets.

40. The communication network system of claim 39, wherein each of said nodes further comprises:

a storing section configured to store a broadcast indication for the respective 1-hop neighbor nodes transmitting the broadcast packets, wherein the identifying in the identifying section is further based on the stored broadcast indication for each 1-hop neighbor node.

41. The communication network system of claim 32, wherein each of said nodes further comprises:

an identifying on-tree neighbor nodes section configured to identify on-tree neighbor nodes having the child or parent hierarchical address relationship with each 1-hop neighbor node; and a determining section configured, for each 1-hop neighbor node and each identified on-tree neighbor node, to determine a hierarchical level indicating a number of nodes between a respective node and a root node, wherein the identifying in the identifying section is further based on the determined hierarchical level.

42. The communication network system of claim 41, wherein the identifying on-tree neighbor nodes section further comprises:

an excluding 1-hop neighbor nodes section configured to exclude 1-hop neighbor nodes of the current node from the identified on-tree neighbor nodes considered in the identifying of the identifying section.

43. The communication network system of claim 41, wherein the identifying section comprises:

an parent node identifying section configured to identify a 1-hop neighbor node as a forwarding node if the 1-hop neighbor node is a parent node of an identified on-tree neighbor node;

an excluding parent and other child nodes section configured to exclude the parent node and other child nodes of the 1-hop neighbor node identified in the parent identifying section from the identified on-tree neighbor nodes considered in the identifying in the identifying section.

44. The communication network system of claim 41, wherein the identifying section comprises:

a child identifying section configured to identify a 1-hop neighbor node as a forwarding node if the 1-hop neighbor node is a child node of an identified on-tree neighbor node and the identified on-tree neighbor node is not a 1-hop neighbor node of the current node.

45. The communication network system of claim 33, wherein each of said nodes further comprises:

an identifying on-tree neighbor nodes section configured to identify on-tree neighbor nodes having the child or parent hierarchical address relationship with each 1-hop neighbor node; and a determining section configured, for each 1-hop neighbor node and each identified on-tree neighbor node, to determine a hierarchical level indicating a number of nodes between a respective node and a root node, wherein the identifying in the identifying section is further based on the determined hierarchical level.

46. The communication network system of claim 45, wherein the identifying on-tree neighbor nodes section further comprises:

an excluding 1-hop neighbor nodes section configured to exclude 1-hop neighbor nodes of the current node from the identified on-tree neighbor nodes considered in the identifying of the identifying section.

47. The communication network system of claim 45, wherein the identifying section comprises:

an parent node identifying section configured to identify a 1-hop neighbor node as a forwarding node if the 1-hop neighbor node is a parent node of an identified on-tree neighbor node;

an excluding parent and other child nodes section configured to exclude the parent node and other child nodes of the 1-hop neighbor node identified in the parent identifying section from the identified on-tree neighbor nodes considered in the identifying in the identifying section.

48. The communication network system of claim 45, wherein the identifying section comprises:

a child identifying section configured to identify a 1-hop neighbor node as a forwarding node if the 1-hop neighbor node is a child node of an identified on-tree neighbor node and the identified on-tree neighbor node is not a 1-hop neighbor node of the current node.

49. The communication network system of claim 34, wherein each of said nodes further comprises:

an identifying on-tree neighbor nodes section configured to identify on-tree neighbor nodes having the child or parent hierarchical address relationship with each 1-hop neighbor node; and a determining section configured, for each 1-hop neighbor node and each identified on-tree neighbor node, to determine a hierarchical level indicating a number of nodes between a respective node and a root node, wherein the identifying in the identifying section is further based on the determined hierarchical level.

50. The communication network system of claim 49, wherein the identifying on-tree neighbor nodes section further comprises:

an excluding 1-hop neighbor nodes section configured to exclude 1-hop neighbor nodes of the current node from the identified on-tree neighbor nodes considered in the identifying of the identifying section.

51. The communication network system of claim 49, wherein the identifying section comprises:

an parent node identifying section configured to identify a 1-hop neighbor node as a forwarding node if the 1-hop neighbor node is a parent node of an identified on-tree neighbor node;

an excluding parent and other child nodes section configured to exclude the parent node and other child nodes of the 1-hop neighbor node identified in the parent identifying section from the identified on-tree neighbor nodes considered in the identifying in the identifying section.

52. The communication network system of claim 49, wherein the identifying section comprises:

a child identifying section configured to identify a 1-hop neighbor node as a forwarding node if the 1-hop neighbor node is a child node of an identified on-tree neighbor node and the identified on-tree neighbor node is not a 1-hop neighbor node of the current node.

53. The communication network system of claim 39, wherein each of said nodes further comprises:

an identifying on-tree neighbor nodes section configured to identify on-tree neighbor nodes having the child or parent hierarchical address relationship with each 1-hop neighbor node; and a determining section configured, for each 1-hop neighbor node and each identified on-tree neighbor node, to determine a hierarchical level indicating a number of nodes between a respective node and a root node, wherein the identifying in the identifying section is further based on the determined hierarchical level.

54. The communication network system of claim 53, wherein the identifying on-tree neighbor nodes section further comprises:

an excluding 1-hop neighbor nodes section configured to exclude 1-hop neighbor nodes of the current node from the identified on-tree neighbor nodes considered in the identifying of the identifying section.

55. The communication network system of claim 53, wherein the identifying section comprises:

an parent node identifying section configured to identify a 1-hop neighbor node as a forwarding node if the 1-hop neighbor node is a parent node of an identified on-tree neighbor node;

an excluding parent and other child nodes section configured to exclude the parent node and other child nodes of the 1-hop neighbor node identified in the parent identifying section from the identified on-tree neighbor nodes considered in the identifying in the identifying section.

56. The communication network system of claim 53, wherein the identifying section comprises:

a child identifying section configured to identify a 1-hop neighbor node as a forwarding node if the 1-hop neighbor node is a child node of an identified on-tree neighbor node and the identified on-tree neighbor node is not a 1-hop neighbor node of the current node.

57. The communication network system of claim 40, wherein each of said nodes further comprises:

an identifying on-tree neighbor nodes section configured to identify on-tree neighbor nodes having the child or parent hierarchical address with each 1-hop neighbor node; and a determining section configured, for each 1-hop neighbor node and each identified on-tree neighbor node, to determine a hierarchical level indicating a number of nodes between a respective node and a root node, wherein the identifying in the identifying section is further based on the determined hierarchical level.

58. The communication network system of claim 57, wherein the identifying on-tree neighbor nodes section further comprises:

an excluding 1-hop neighbor nodes section configured to exclude 1-hop neighbor nodes of the current node from the identified on-tree neighbor nodes considered in the identifying of the identifying section.

59. The communication network system of claim 57, wherein the identifying section comprises:

an parent node identifying section configured to identify a 1-hop neighbor node as a forwarding node if the 1-hop neighbor node is a parent node of an identified on-tree neighbor node;

an excluding parent and other child nodes section configured to exclude the parent node and other child nodes of the 1-hop neighbor node identified in the parent identifying section from the identified on-tree neighbor nodes considered in the identifying in the identifying section.

60. The method of claim 57, wherein the identifying section comprises:

a child identifying section configured to identify a 1-hop neighbor node as a forwarding node if the 1-hop neighbor node is a child node of an identified on-tree neighbor node and the identified on-tree neighbor node is not a 1-hop neighbor node of the current node.

61. A node in a communication network that includes a plurality of hierarchically addressed nodes each including a child or parent hierarchical address relationship in which an address of each child node includes information identifying an address of a parent node, said node having a current node address and configured to be within a communication range of 1-hop neighbor nodes and in the hierarchical address relationship with a number of respective on-tree parent and child nodes and configured to rebroadcast a received packet identifying the current node address as a forwarding node, said node comprising:

- a receiving section configured to receive communication packets identifying (1) 1-hop neighbor node addresses of respective 1-hop neighbor nodes transmitting the packets, (2) a number defining how many on-tree neighbor nodes have the child or parent hierarchical address relationship with the respective 1-hop neighbor nodes transmitting the packets, and (3) forwarding node addresses of forwarding nodes from which the received packets are to be rebroadcast;
- a storing section configured to store said 1-hop neighbor addresses and said number of on-tree neighbor nodes;
- an identifying section configured to identify, based on the stored 1-hop neighbor addresses and the stored number of on-tree neighbor nodes, each 1-hop neighbor node which should be a forwarding node instructed to rebroadcast information included in a received communication packet;
- a producing section configured to produce a rebroadcast communication packet including information to be rebroadcast, the current node address, and addresses of forwarding nodes identified in the identifying section when the received packet identifies the current node address as a forwarding node which should rebroadcast the received information; and
- a transmitting section configured to transmit the produced rebroadcast communication packet.

62. The node of claim 61, wherein the rebroadcast producing section comprises:

- a directed producing section configured to produce a directed rebroadcast communication packet identifying the number of respective on-tree parent and child nodes.

63. The node of claim 61, wherein the receiving section comprises:

- a non-directed receiving section configured to receive non-directed communication packets from 1-hop neighbor nodes, including information intended to be received by each node in the plurality of hierarchically addressed nodes, said 1-hop neighbor addresses of the respective 1-hop neighbor nodes transmitting the non-directed packets, and said forwarding node addresses of forwarding nodes from which the information in received non-directed packets are to be rebroadcast; and
- a directed receiving section configured to receive directed communication packets including information intended to be received by a subset of nodes in the plurality of hierarchically addressed nodes, said 1-hop neighbor addresses of the respective 1-hop neighbor nodes transmitting the directed packets, and said number defining how many on-tree neighbor nodes have the child or parent hierarchical address relationship with the respective 1-hop neighbor nodes transmitting the packets.

64. The node of claim 63 further comprising:

- a storing section configured to store a broadcast indication for the respective 1-hop neighbor nodes transmitting the non-directed packets,
- wherein the identifying in the identifying section is further based on the stored broadcast indication for each 1-hop neighbor node.

65. The node of claim 61 further comprising:

- an identifying on-tree neighbor nodes section configured to identify on-tree neighbor nodes having the child or parent hierarchical address relationship with each 1-hop neighbor node; and
- a determining section configured, for each 1-hop neighbor node and each identified on-tree neighbor node, to determine a hierarchical level indicating a number of nodes between a respective node and a root node,
- wherein the identifying in the identifying section is further based on the determined hierarchical level.

66. The node of claim 65, wherein the identifying on-tree neighbor nodes section further comprises:

- an excluding 1-hop neighbor nodes section configured to exclude 1-hop neighbor nodes within the communication range from the identified on-tree neighbor nodes considered in the identifying of the identifying section.

67. The node of claim 65, wherein the identifying section comprises:

- a parent and other child nodes identifying section configured to identify a 1-hop neighbor node within the communication range as a forwarding node if the 1-hop neighbor node is a parent node of an identified on-tree neighbor node;
- an excluding parent and other child nodes section configured to exclude the parent node and other child nodes of the 1-hop neighbor node identified in the parent identifying section from the identified on-tree neighbor nodes considered in the identifying in the identifying section.

68. The node of claim 65, wherein the identifying section comprises:

- a child identifying section configured to identify a 1-hop neighbor node as a forwarding node if the 1-hop neighbor node is a child node of an identified on-tree neighbor node and the identified on-tree neighbor node is not a 1-hop neighbor node within the communication range.

69. The node of claim 62, wherein the receiving section comprises:

- a non-directed receiving section configured to receive non-directed communication packets from 1-hop neighbor nodes, including information intended to be received by each node in the plurality of hierarchically addressed nodes, said 1-hop neighbor addresses of the respective 1-hop neighbor nodes transmitting the non-directed packets, and said forwarding node addresses of forwarding nodes from which the information in received non-directed packets are to be rebroadcast; and
- a directed receiving section configured to receive directed communication packets including information intended to be received by a subset of nodes in the plurality of hierarchically addressed nodes, said 1-hop neighbor addresses of the respective 1-hop neighbor nodes transmitting the directed packets, and said number defining how many on-tree neighbor nodes have the child or parent hierarchical address relationship with the respective 1-hop neighbor nodes transmitting the packets.

70. The node of claim 69 further comprising:

- a storing section configured to store a broadcast indication for the respective 1-hop neighbor nodes transmitting the non-directed packets,
- wherein the identifying in the identifying section is further based on the stored broadcast indication for each 1-hop neighbor node.

71. The node of claim 62 further comprising:
an identifying on-tree neighbor nodes section configured to identify on-tree neighbor nodes having the child or parent hierarchical address relationship with each 1-hop neighbor node; and
a determining section configured, for each 1-hop neighbor node and each identified on-tree neighbor node, to determine a hierarchical level indicating a number of nodes between a respective node and a root node,
wherein the identifying in the identifying section is further based on the determined hierarchical level.

72. The node of claim 71, wherein the identifying on-tree neighbor nodes section further comprises:
an excluding 1-hop neighbor nodes section configured to exclude the 1-hop neighbor nodes within the communication range from the identified on-tree neighbor nodes considered in the identifying of the identifying section.

73. The node of claim 71, wherein the identifying section comprises:
a parent and other child nodes identifying section configured to identify a 1-hop neighbor node within the communication range as a forwarding node if the 1-hop neighbor node is a parent node of an identified on-tree neighbor node;
an excluding parent and other child nodes section configured to exclude the parent node and other child nodes of the 1-hop neighbor node identified in the parent identifying section from the identified on-tree neighbor nodes considered in the identifying in the identifying section.

74. The node of claim 71, wherein the identifying section comprises:
a child identifying section configured to identify a 1-hop neighbor node as a forwarding node if the 1-hop neighbor node is a child node of an identified on-tree neighbor node and the identified on-tree neighbor node is not a 1-hop neighbor node within the communication range.

75. The node of claim 63 further comprising:
an identifying on-tree neighbor nodes section configured to identify on-tree neighbor nodes having the child or parent hierarchical address relationship with each 1-hop neighbor node; and
a determining section configured, for each 1-hop neighbor node and each identified on-tree neighbor node, to determine a hierarchical level indicating a number of nodes between a respective node and a root node,
wherein the identifying in the identifying section is further based on the determined hierarchical level.

76. The node of claim 75, wherein the identifying on-tree neighbor nodes section further comprises:
an excluding 1-hop neighbor nodes section configured to exclude the 1-hop neighbor nodes within the communication range from the identified on-tree neighbor nodes considered in the identifying of the identifying section.

77. The node of claim 75, wherein the identifying section comprises:
a parent and other child nodes identifying section configured to identify a 1-hop neighbor node within the communication range as a forwarding node if the 1-hop neighbor node is a parent node of an identified on-tree neighbor node;
an excluding parent and other child nodes section configured to exclude the parent node and other child nodes of the 1-hop neighbor node identified in the parent identifying section from the identified on-tree neighbor nodes considered in the identifying in the identifying section.

78. The node of claim 75, wherein the identifying section comprises:
a child identifying section configured to identify a 1-hop neighbor node as a forwarding node if the 1-hop neighbor node is a child node of an identified on-tree neighbor node and the identified on-tree neighbor node is not a 1-hop neighbor node within the communication range.

79. The node of claim 64 further comprising:
an identifying on-tree neighbor nodes section configured to identify on-tree neighbor nodes having the child or parent hierarchical address relationship with each 1-hop neighbor node; and
a determining section configured, for each 1-hop neighbor node and each identified on-tree neighbor node, to determine a hierarchical level indicating a number of nodes between a respective node and a root node,
wherein the identifying in the identifying section is further based on the determined hierarchical level.

80. The node of claim 79, wherein the identifying on-tree neighbor nodes section further comprises:
an excluding 1-hop neighbor nodes section configured to exclude 1-hop neighbor nodes within the communication range from the identified on-tree neighbor nodes considered in the identifying of the identifying section.

81. The node of claim 79, wherein the identifying section comprises:
a parent and other child nodes identifying section configured to identify a 1-hop neighbor node within the communication range as a forwarding node if the 1-hop neighbor node is a parent node of an identified on-tree neighbor node;
an excluding parent and other child nodes section configured to exclude the parent node and other child nodes of the 1-hop neighbor node identified in the parent identifying section from the identified on-tree neighbor nodes considered in the identifying in the identifying section.

82. The node of claim 79, wherein the identifying section comprises:
a child identifying section configured to identify a 1-hop neighbor node as a forwarding node if the 1-hop neighbor node is a child node of an identified on-tree neighbor node and the identified on-tree neighbor node is not a 1-hop neighbor node within the communication range.

83. The node of claim 69 further comprising:
an identifying on-tree neighbor nodes section configured to identify on-tree neighbor nodes having the child or parent hierarchical address relationship with each 1-hop neighbor node; and
a determining section configured, for each 1-hop neighbor node and each identified on-tree neighbor node, to determine a hierarchical level indicating a number of nodes between a respective node and a root node,
wherein the identifying in the identifying section is further based on the determined hierarchical level.

84. The node of claim 83, wherein the identifying on-tree neighbor nodes section further comprises:
an excluding 1-hop neighbor nodes section configured to exclude the 1-hop neighbor nodes within the communication range from the identified on-tree neighbor nodes considered in the identifying of the identifying section.

85. The node of claim 83, wherein the identifying section comprises:
a parent and other child nodes identifying section configured to identify a 1-hop neighbor node within the communication range as a forwarding node if the 1-hop neighbor node is a parent node of an identified on-tree neighbor node;
an excluding parent and other child nodes section configured to exclude the parent node and other child nodes of the 1-hop neighbor node identified in the parent identifying section from the identified on-tree neighbor nodes considered in the identifying in the identifying section.

86. The node of claim 83, wherein the identifying section comprises:
a child identifying section configured to identify a 1-hop neighbor node as a forwarding node if the 1-hop neighbor node is a child node of an identified on-tree neighbor node and the identified on-tree neighbor node is not a 1-hop neighbor node within the communication range.

87. The node of claim 70 further comprising:
an identifying on-tree neighbor nodes section configured to identify on-tree neighbor nodes having the child or parent hierarchical address relationship with each 1-hop neighbor node; and
a determining section configured, for each 1-hop neighbor node and each identified on-tree neighbor node, to determine a hierarchical level indicating a number of nodes between a respective node and a root node,
wherein the identifying in the identifying section is further based on the determined hierarchical level.

88. The node of claim 87, wherein the identifying on-tree neighbor nodes section further comprises:
an excluding 1-hop neighbor nodes section configured to exclude the 1-hop neighbor nodes within the communication range from the identified on-tree neighbor nodes considered in the identifying of the identifying section.

89. The node of claim 87, wherein the identifying section comprises:
a parent and other child nodes identifying section configured to identify a 1-hop neighbor node within the communication range as a forwarding node if the 1-hop neighbor node is a parent node of an identified on-tree neighbor node;
an excluding parent and other child nodes section configured to exclude the parent node and other child nodes of the 1-hop neighbor node identified in the parent identifying section from the identified on-tree neighbor nodes considered in the identifying in the identifying section.

90. The node of claim 87, wherein the identifying section comprises:
a child identifying section configured to identify a 1-hop neighbor node as a forwarding node if the 1-hop neighbor node is a child node of an identified on-tree neighbor node and the identified on-tree neighbor node is not a 1-hop neighbor node within the communication range.

91. A computer readable medium including computer executable instructions, wherein the instructions, when executed by a processor, cause the processor to perform a method of communicating information in a communication network including a plurality of hierarchically addressed nodes each including a child or parent address relationship in which an address of each child node includes information identifying an address of a parent node, the method comprising:
(a) receiving at a current node communication packets transmitted from 1-hop neighbor nodes within a communication range of the current node, said communication packets identifying (1) 1-hop neighbor node addresses of the respective 1-hop neighbor nodes transmitting the packets, (2) a number defining how many on-tree neighbor nodes have the child or parent hierarchical address relationship with the respective 1-hop neighbor nodes transmitting the packets, and (3) forwarding node addresses of forwarding nodes from which the received packets are to be rebroadcast;
(b) storing said 1-hop neighbor node addresses and said number of on-tree neighbor nodes;
(c) when a received packet at the current node identifies the current node as a forwarding node which should rebroadcast the received packet, identifying based on the stored 1-hop neighbor addresses and the stored number of on-tree neighbor nodes, each 1-hop neighbor node which should be a forwarding node instructed to rebroadcast information included in a communication packet received from the current node;
(d) producing at the current node a rebroadcast communication packet including information to be rebroadcast, an address of the current node, and addresses of forwarding nodes identified in step (c) when the received packet at the current node identifies the current node as a forwarding node which should rebroadcast the received information; and
(e) transmitting from the current node the rebroadcast communication packet produced in step (d).

92. The computer readable medium of claim 91, further comprising:
producing at the current node a communication packet identifying a number defining how many 1-hop neighbor nodes have the child or parent hierarchical address relationship with the current node; and
transmitting the communication packet identifying the defined number of 1-hop neighbor nodes having the child or parent hierarchical address relationship with the current node.

93. The computer readable medium of claim 91, wherein step (a) comprises:
(a-1) receiving at the current node non-directed communication packets from 1-hop neighbor nodes, including information intended to be received by each node in the plurality of hierarchically addressed nodes, said 1-hop neighbor addresses of the respective 1-hop neighbor nodes transmitting the non-directed packets, and said forwarding node addresses of forwarding nodes from which the information in received non-directed packets are to be rebroadcast; and
(a-2) receiving at the current node directed communication packets including information intended to be received by a subset of nodes in the plurality of hierarchically addressed nodes, said 1-hop neighbor addresses of the respective 1-hop neighbor nodes transmitting the directed packets, and said number defining how many on-tree neighbor nodes have the child or parent hierarchical address relationship with the respective 1-hop neighbor nodes transmitting the packets.

94. The computer readable medium of claim 93, further comprising:
storing a broadcast indication for the respective 1-hop neighbor nodes transmitting the non-directed packets,
wherein the identifying in step (c) is further based on the stored broadcast indication for each 1-hop neighbor node.

95. The computer readable medium of claim 91, further comprising:
identifying on-tree neighbor nodes having the child or parent hierarchical address relationship with each 1-hop neighbor node; and
determining, for each 1-hop neighbor node and each identified on-tree neighbor node, a hierarchical level indicating a number of nodes between a respective node and a root node,
wherein the identifying in step (c) is further based on the determined hierarchical level.

96. The computer readable medium of claim 95, wherein the step of identifying on-tree neighbor nodes further comprises:
- excluding 1-hop neighbor nodes of the current node from the identified on-tree neighbor nodes considered in the determining in step (c).

97. The computer readable medium of claim 95, wherein step (c) comprises:
- (c-1) identifying a 1-hop neighbor node as a forwarding node if the 1-hop neighbor node is a parent node of an identified on-tree neighbor node;
- (c-2) excluding the parent node and other child nodes of the 1-hop neighbor node identified in step (c-1) from the identified on-tree neighbor nodes considered in the determining step (c).

98. The computer readable medium of claim 95, wherein step (c) comprises:
- (c-1) identifying a 1-hop neighbor node as a forwarding node if the 1-hop neighbor node is a child node of an identified on-tree neighbor node and the identified on-tree neighbor node is not a 1-hop neighbor node of the current node.

99. The computer readable medium of claim 92, wherein step (a) comprises:
- (a-1) receiving at the current node non-directed communication packets from 1-hop neighbor nodes, including information intended to be received by each node in the plurality of hierarchically addressed nodes, said 1-hop neighbor addresses of the respective 1-hop neighbor nodes transmitting the non-directed packets, and said forwarding node addresses of forwarding nodes from which the information in received non-directed packets are to be rebroadcast; and
- (a-2) receiving at the current node directed communication packets including information intended to be received by a subset of nodes in the plurality of hierarchically addressed nodes, said 1-hop neighbor addresses of the respective 1-hop neighbor nodes transmitting the directed packets, and said number defining how many on-tree neighbor nodes have the child or parent hierarchical address relationship with the respective 1-hop neighbor nodes transmitting the packets.

100. The computer readable medium of claim 99, further comprising:
- storing a broadcast indication for the respective 1-hop neighbor nodes transmitting the non-directed packets,
- wherein the identifying in step (c) is further based on the stored broadcast indication for each 1-hop neighbor node.

101. The computer readable medium of claim 92, further comprising:
- identifying on-tree neighbor nodes having the child or parent hierarchical address relationship with each 1-hop neighbor node; and
- determining, for each 1-hop neighbor node and each identified on-tree neighbor node, a hierarchical level indicating a number of nodes between a respective node and a root node,
- wherein the identifying in step (c) is further based on the determined hierarchical level.

102. The computer readable medium of claim 101, wherein the step of identifying on-tree nodes further comprises:
- excluding 1-hop neighbor nodes of the current node from the identified on-tree neighbor nodes considered in the determining in step (c).

103. The computer readable medium of claim 101, wherein step (c) comprises:
- (c-1) identifying a 1-hop neighbor node as a forwarding node if the 1-hop neighbor node is a parent node of an identified on-tree neighbor node;
- (c-2) excluding the parent node and other child nodes of the 1-hop neighbor node identified in step (c-1) from the identified on-tree neighbor nodes considered in the determining step (c).

104. The computer readable medium of claim 101, wherein step (c) comprises:
- (c-1) identifying a 1-hop neighbor node as a forwarding node if the 1-hop neighbor node is a child node of an identified on-tree neighbor node and the identified on-tree neighbor node is not a 1-hop neighbor node of the current node.

105. The computer readable medium of claim 93, further comprising:
- identifying on-tree neighbor nodes having the child or parent hierarchical address relationship with each 1-hop neighbor node; and
- determining, for each 1-hop neighbor node and each identified on-tree neighbor node, a hierarchical level indicating a number of nodes between a respective node and a root node,
- wherein the identifying in step (c) is further based on the determined hierarchical level.

106. The computer readable medium of claim 105, wherein the step of identifying on-tree nodes further comprises:
- excluding 1-hop neighbor nodes of the current node from the identified on-tree neighbor nodes considered in the determining in step (c).

107. The computer readable medium of claim 105, wherein step (c) comprises:
- (c-1) identifying a 1-hop neighbor node as a forwarding node if the 1-hop neighbor node is a parent node of an identified on-tree neighbor node;
- (c-2) excluding the parent node and other child nodes of the 1-hop neighbor node identified in step (c-1) from the identified on-tree neighbor nodes considered in the determining step (c).

108. The computer readable medium of claim 105, wherein step (c) comprises:
- (c-1) identifying a 1-hop neighbor node as a forwarding node if the 1-hop neighbor node is a child node of an identified on-tree neighbor node and the identified on-tree neighbor node is not a 1-hop neighbor node of the current node.

109. The computer readable medium of claim 94, further comprising:
- identifying on-tree neighbor nodes having the child or parent hierarchical address relationship with each 1-hop neighbor node; and
- determining, for each 1-hop neighbor node and each identified on-tree neighbor node, a hierarchical level indicating a number of nodes between a respective node and a root node,
- wherein the identifying in step (c) is further based on the determined hierarchical level.

110. The computer readable medium of claim 109, wherein the step of identifying on-tree nodes further comprises:
- excluding 1-hop neighbor nodes of the current node from the identified on-tree neighbor nodes considered in the determining in step (c).

111. The computer readable medium of claim 109, wherein step (c) comprises:
- (c-1) identifying a 1-hop neighbor node as a forwarding node if the 1-hop neighbor node is a parent node of an identified on-tree neighbor node;

(c-2) excluding the parent node and other child nodes of the 1-hop neighbor node identified in step (c-1) from the identified on-tree neighbor nodes considered in the determining step (c).

112. The computer readable medium of claim 109, wherein step (c) comprises:
(c-1) identifying a 1-hop neighbor node as a forwarding node if the 1-hop neighbor node is a child node of an identified on-tree neighbor node and the identified on-tree neighbor node is not a 1-hop neighbor node of the current node.

113. The computer readable medium of claim 99, further comprising:
identifying on-tree neighbor nodes having the child or parent hierarchical address relationship with each 1-hop neighbor node; and
determining, for each 1-hop neighbor node and each identified on-tree neighbor node, a hierarchical level indicating a number of nodes between a respective node and a root node,
wherein the identifying in step (c) is further based on the determined hierarchical level.

114. The computer readable medium of claim 113, wherein the step of identifying on-tree nodes further comprises:
excluding 1-hop neighbor nodes of the current node from the identified on-tree neighbor nodes considered in the determining in step (c).

115. The computer readable medium of claim 113, wherein step (c) comprises:
(c-1) identifying a 1-hop neighbor node as a forwarding node if the 1-hop neighbor node is a parent node of an identified on-tree neighbor node;
(c-2) excluding the parent node and other child nodes of the 1-hop neighbor node identified in step (c-1) from the identified on-tree neighbor nodes considered in the determining step (c).

116. The computer readable medium of claim 113, wherein step (c) comprises:
(c-1) identifying a 1-hop neighbor node as a forwarding node if the 1-hop neighbor node is a child node of an identified on-tree neighbor node and the identified on-tree neighbor node is not a 1-hop neighbor node of the current node.

117. The computer readable medium of claim 100, further comprising:
identifying on-tree neighbor nodes having the child or parent hierarchical address relationship with each 1-hop neighbor node; and
determining, for each 1-hop neighbor node and each identified on-tree neighbor node, a hierarchical level indicating a number of nodes between a respective node and a root node,
wherein the identifying in step (c) is further based on the determined hierarchical level.

118. The computer readable medium of claim 117, wherein the step of identifying on-tree nodes further comprises:
excluding 1-hop neighbor nodes of the current node from the identified on-tree neighbor nodes considered in the determining in step (c).

119. The computer readable medium of claim 117, wherein step (c) comprises:
(c-1) identifying a 1-hop neighbor node as a forwarding node if the 1-hop neighbor node is a parent node of an identified on-tree neighbor node;
(c-2) excluding the parent node and other child nodes of the 1-hop neighbor node identified in step (c-1) from the identified on-tree neighbor nodes considered in the determining step (c).

120. The computer readable medium of claim 117, wherein step (c) comprises:
(c-1) identifying a 1-hop neighbor node as a forwarding node if the 1-hop neighbor node is a child node of an identified on-tree neighbor node and the identified on-tree neighbor node is not a 1-hop neighbor node of the current node.

* * * * *